US012790973B2

(12) United States Patent
Uchibori

(10) Patent No.: US 12,790,973 B2
(45) Date of Patent: Nov. 10, 2026

(54) ENGINE DEVICE

(71) Applicant: YANMAR POWER TECHNOLOGY CO., LTD., Osaka (JP)

(72) Inventor: Masataka Uchibori, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 17/862,972

(22) Filed: Jul. 12, 2022

(65) Prior Publication Data

US 2022/0349332 A1 Nov. 3, 2022

Related U.S. Application Data

(63) Continuation of application No. 16/496,855, filed as application No. PCT/JP2017/044510 on Dec. 12, 2017, now Pat. No. 11,408,324.

(30) Foreign Application Priority Data

Mar. 24, 2017 (JP) ................................ 2017-060185

(51) Int. Cl.
*F01N 13/18* (2010.01)
*F02B 37/013* (2006.01)
(Continued)

(52) U.S. Cl.
CPC ........ *F01N 13/1805* (2013.01); *F02B 37/013* (2013.01); *F01N 3/021* (2013.01);
(Continued)

(58) Field of Classification Search
CPC ...... F01N 13/10; F01N 13/1805; F01N 3/021; F01N 3/28; F01N 2590/08; F02B 37/004; F02B 37/013
See application file for complete search history.

(56) References Cited

U.S. PATENT DOCUMENTS 8,544,267 B2 10/2013 Danielewicz et al.
2006/0123786 A1* 6/2006 Gobert ................. F02B 37/013 60/605.1
(Continued)

FOREIGN PATENT DOCUMENTS

JP 2005-120937 A 5/2005
JP 2007263033 A * 10/2007
(Continued)

OTHER PUBLICATIONS

International Search Report dated Jan. 23, 2018 issued in corresponding PCT Application PCT/JP2017/044510.

*Primary Examiner* — Loren C Edwards
(74) *Attorney, Agent, or Firm* — NORTON ROSE FULBRIGHT US LLP

(57) ABSTRACT

An engine device includes an exhaust manifold provided on an exhaust side surface which is a first side surface of a cylinder head and a two-stage turbocharger that is driven by exhaust gas discharged from the exhaust manifold. The two-stage turbocharger includes a high-pressure turbocharger coupled to the exhaust manifold, and a low-pressure turbocharger coupled to the high-pressure turbocharger. The high-pressure turbocharger is arranged on a side of the exhaust manifold. The low-pressure turbocharger is arranged above the exhaust manifold. An exhaust gas outlet of the high-pressure turbocharger and an exhaust gas inlet of the low-pressure turbocharger are coupled with each other through a flexible high-pressure exhaust gas pipe.

15 Claims, 23 Drawing Sheets

(51) Int. Cl.
*F01N 3/021* (2006.01)
*F01N 3/28* (2006.01)
*F01N 13/10* (2010.01)
*F02B 37/00* (2006.01)

(52) U.S. Cl.
CPC ................ *F01N 3/28* (2013.01); *F01N 13/10* (2013.01); *F01N 2590/08* (2013.01); *F02B 37/004* (2013.01)

(56) References Cited

U.S. PATENT DOCUMENTS

| | | | | |
|---|---|---|---|---|
| 2010/0313561 | A1* | 12/2010 | Niwa | B60K 13/04 60/274 |
| 2011/0167808 | A1* | 7/2011 | Kosaka | F01N 3/08 60/272 |
| 2012/0003075 | A1 | 1/2012 | Niwa et al. | |
| 2012/0090320 | A1 | 4/2012 | Kuhlbach et al. | |
| 2012/0255515 | A1 | 10/2012 | Xie et al. | |
| 2012/0255528 | A1* | 10/2012 | Gunkel | F01N 13/1811 123/562 |
| 2013/0269341 | A1* | 10/2013 | Kurata | F02B 37/18 60/605.2 |
| 2015/0337698 | A1* | 11/2015 | Ruppel | B01D 46/0005 123/193.5 |

FOREIGN PATENT DOCUMENTS

| | | | | |
|---|---|---|---|---|
| JP | 4517550 | B2 | 8/2010 | |
| JP | 2010-285959 | A | 12/2010 | |
| JP | 2011-169272 | A | 9/2011 | |
| JP | 2012-140890 | A | 7/2012 | |
| JP | 5237785 | B2 | 7/2013 | |
| JP | 2015086724 | A * | 5/2015 | F02B 37/013 |
| JP | 2016-037909 | A | 3/2016 | |
| JP | 2016-205319 | A | 12/2016 | |

* cited by examiner

ENGINE DEVICE

CROSS-REFERENCE TO RELATED APPLICATIONS

The present application is a continuation of U.S. patent application Ser. No. 16/496,855 filed Sep. 23, 2019, which is a national stage application under 35 U.S.C. § 371 of International Pat. App. No. PCT/JP2017/044510 filed Dec. 12, 2017, which claims priority under 35 U.S.C. § 119 to JP Pat. App. No. 2017-060185 filed Mar. 24, 2017, the disclosures of each disclosure are hereby incorporated by reference in their entireties.

TECHNICAL FIELD

The present invention relates to an engine device including a turbocharger.

BACKGROUND

Conventionally, an engine device is equipped with a turbocharger that uses exhaust energy to compress fresh air, in order to increase an air density in an engine cylinder, for the purpose of enhancing an engine output and improving fuel efficiency (see, JP Patent No. 4517550 (PTL 1)). In a diesel engine, a large amount of high-density air is supplied into a cylinder to combust a large amount of fuel, which can increase an engine output and an engine torque, and also can facilitate mixing of the fuel and air to thereby reduce the amount of NOx discharge with suppression of premix combustion.

Since a single-stage turbocharger including a single turbocharger has a limitation against the requirement of a high-output engine, an engine equipped with a two-stage turbocharger in which two turbochargers of a high-pressure stage and a low-pressure stage are coupled in series has been proposed (see JP Patent No. 5237785 (PTL 2)).

An installation space for an engine varies depending on a work vehicle (such as a construction machine or an agricultural machine) to which the engine is installed. Recently, due to demand for weight reduction and compactification, the installation space is often restricted (confined). It therefore is necessary that component parts of the engine are arranged in a compact layout.

A technical problem of the present invention is to provide an engine device that is improved based on studies on the existing circumstances as mentioned above.

SUMMARY OF INVENTION

An engine device according to an aspect of the present invention includes: an exhaust manifold provided on an exhaust side surface that is one side surface of a cylinder head; and a turbocharger configured to be driven by exhaust gas exhausted from the exhaust manifold, wherein: the turbocharger is constituted by a two-stage turbocharger including a high-pressure turbocharger coupled to the exhaust manifold and a low-pressure turbocharger coupled to the high-pressure turbocharger; and the high-pressure turbocharger is fixed to the exhaust manifold and is disposed on a lateral side of the exhaust manifold whereas the low-pressure turbocharger is fixed to the exhaust side surface of the cylinder head and is disposed above the exhaust manifold, and an exhaust gas outlet of the high-pressure turbocharger and an exhaust gas inlet of the low-pressure turbocharger are coupled to each other through a flexible pipe.

The engine device according to the above aspect of the present invention may be such that the cylinder head has therein a rib extended from an attaching part for the low-pressure turbocharger on the exhaust side surface toward an air-intake side surface facing the exhaust side surface.

The engine device according to the above aspect of the present invention may include an exhaust gas purification device configured to purify exhaust gas from the exhaust manifold, wherein an exhaust gas inlet of the exhaust gas purification device is arranged nearby a corner where the exhaust side surface intersects with a first side surface out of two side surfaces of the cylinder head intersecting the exhaust side surface, and the low-pressure turbocharger is disposed close to the first side surface in such a manner that an exhaust gas outlet of the low-pressure turbocharger faces the first side surface, when viewed from the exhaust side surface.

Further, above the cylinder head, a blow-by gas outlet of a blow-by gas recirculation device may be arranged in a position close to a second side surface of the cylinder head on the opposite side of the first side surface in such a manner as to face toward the exhaust side surface, a fresh air inlet of the low-pressure turbocharger may be provided to face the second side surface, and the blow-by gas outlet may be coupled with an air supply pipe coupled with the fresh air inlet of the low-pressure turbocharger through a recirculation hose.

In an engine device according to an aspect of the present invention, the high-pressure turbocharger with a small capacity is arranged on a lateral side of the exhaust manifold, and the low-pressure turbocharger with a large capacity is arranged above the exhaust manifold. Therefore, the exhaust manifold and the two-stage turbocharger can be compactly arranged in a substantially quadrangular frame, and downsizing of the engine device can be achieved. Further, since the exhaust gas outlet of the high-pressure turbocharger and the exhaust gas inlet of the low-pressure turbocharger are coupled through a flexible pipe, a risk of a low cycle fatigue breakdown of the piping due to thermal expansion can be reduced. Further, since the low-pressure turbocharger is fixed to the exhaust side surface of the cylinder head and the high-pressure turbocharger is fixed to the exhaust manifold, the high-pressure turbocharger and the low-pressure turbocharger constituting the two-stage turbocharger can be distributed to and firmly fixed to the robust cylinder head and the exhaust manifold. Further, since the exhaust gas outlet of the high-pressure turbocharger and the exhaust gas inlet of the low-pressure turbocharger are coupled through a flexible pipe, a stress to the two-stage turbocharger, which is attributed to the thermal expansion of the piping, can be reduced. As a result, a stress applied to a coupling portion of the high-pressure turbocharger and the exhaust manifold, and a stress applied to a coupling portion of the low-pressure turbocharger and the cylinder head can be reduced, and coupling failure at these coupling portions and damages to coupling members can be suppressed or reduced.

The engine device according to the above aspect of the present invention is such that the cylinder head has therein a rib extended from an attaching part for the low-pressure turbocharger on the exhaust side surface toward an air-intake side surface facing the exhaust side surface. With this structure, the rigidity of the cylinder head nearby the attaching part for the low-pressure turbocharger can be improved, and deformation and the like of the cylinder head which is caused by attaching the low-pressure turbocharger to the cylinder head can be suppressed or reduced.

The engine device according to the above aspect of the present invention includes an exhaust gas purification device configured to purify the exhaust gas from the exhaust manifold, wherein: an exhaust gas inlet of the exhaust gas purification device is arranged nearby a corner where the exhaust side surface intersects with a first side surface out of two side surfaces of the cylinder head intersecting the exhaust side surface, and the low-pressure turbocharger is disposed close to the first side surface in such a manner that an exhaust gas outlet of the low-pressure turbocharger faces the first side surface, when viewed from the exhaust side surface. With this structure, piping connecting the exhaust gas outlet of the low-pressure turbocharger and the exhaust gas inlet of the exhaust gas purification device can be made short and simple. This way, the exhaust gas supplied to the exhaust gas purification device can be kept at a high temperature, and a drop in the regeneration performance of the exhaust gas purification device can be suppressed or reduced.

Further, above the cylinder head, a blow-by gas outlet of a blow-by gas recirculation device is arranged in a position close to a second side surface of the cylinder head on the opposite side of the first side surface in such a manner as to face toward the exhaust side surface, a fresh air inlet of the low-pressure turbocharger is provided to face the second side surface, and the blow-by gas outlet is coupled with an air supply pipe coupled with the fresh air inlet of the low-pressure turbocharger through a recirculation hose. With this structure, the recirculation hose can be shortened and measures against freezing inside the recirculation hose are no longer necessary, by arranging both the blow-by gas outlet of the blow-by gas recirculation device and the air supply pipe coupled with the fresh air inlet of the low-pressure turbocharger at a position close to the second side surface of the cylinder head.

DESCRIPTION OF EMBODIMENTS

Figure 1:
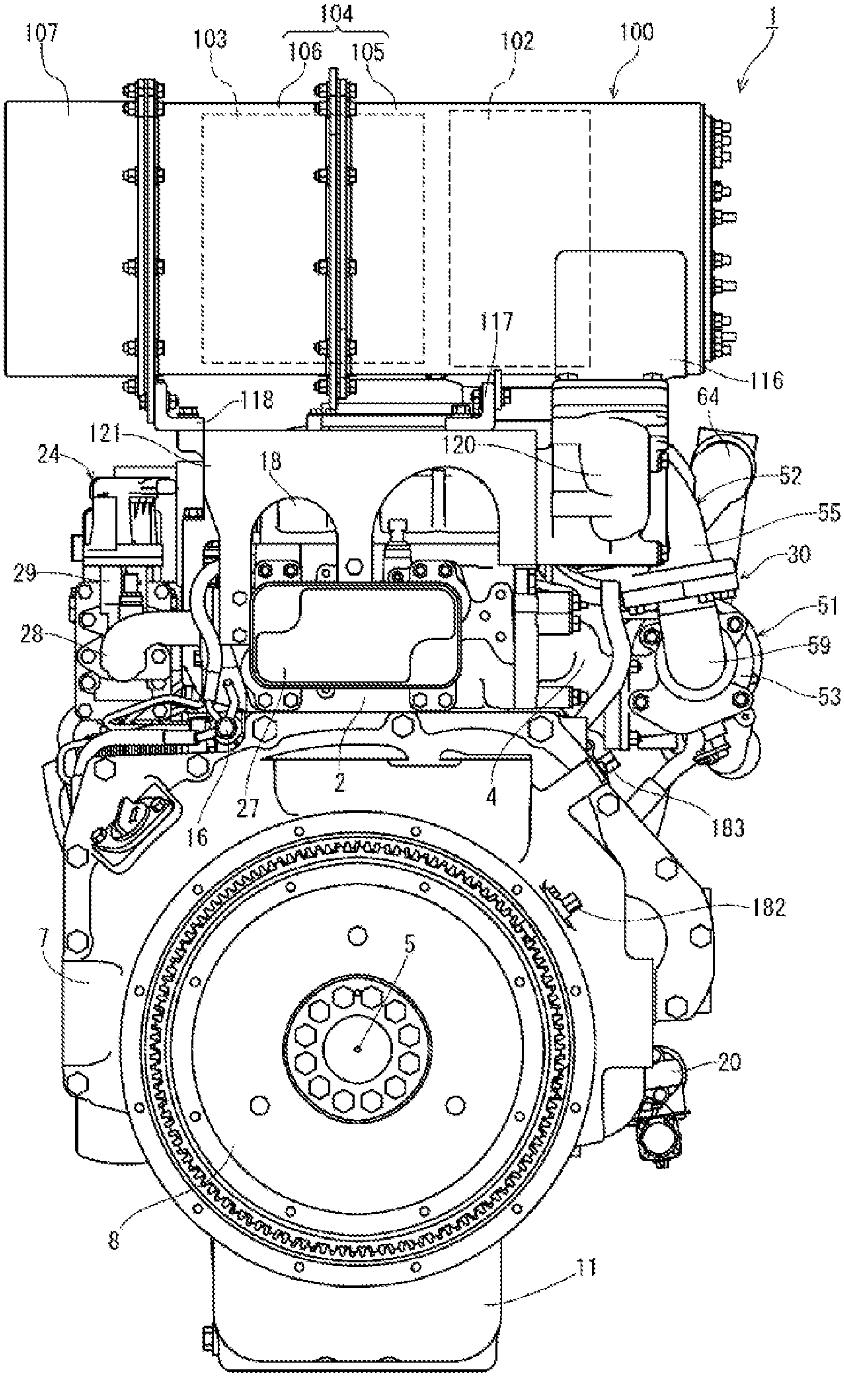
FIG. 1 is a schematic front view of one embodiment of an engine device.

In the following, an embodiment of the present invention will be described with reference to the drawings. First, referring to FIG. 1 to FIG. 5, an overall structure of an engine 1 as an example of an engine device will be described. In this embodiment, the engine 1 is constituted by a diesel engine. In the descriptions on engine 1 below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in the diesel engine 1.

As shown in FIG. 1 to FIG. 5, an air-intake manifold 3 and an exhaust manifold 4 are disposed in one side portion and the other side portion of the engine 1 parallel to the crankshaft 5, respectively. In the embodiment, the air-intake manifold 3 is provided on a right side surface of a cylinder head 2 and is formed integrally with the cylinder head 2. The exhaust manifold 4 is provided on a left side surface of the cylinder head 2. The cylinder head 2 is mounted on a cylinder block 6 in which the crankshaft 5 and a piston (not shown) are disposed.

The crankshaft 5 has its front and rear distal ends protruding from front and rear surfaces of the cylinder block 6. The flywheel housing 7 is fixed to one side portion of the engine 1 (in the embodiment, a front side surface side of the cylinder block 6) intersecting the crankshaft 5. In the flywheel housing 7, a flywheel 8 is disposed. The flywheel 8, which is fixed to the front end side of the crankshaft 5, is configured to rotate integrally with the crankshaft 5. Through the flywheel 8, power of the engine 1 is extracted to an actuating part of a work machine (for example, a hydraulic shovel, a forklift, or the like). The cooling fan 9 is disposed in the other side portion of the engine 1 (in the embodiment, a rear surface side of the cylinder block 6) intersecting the crankshaft 5. A rotational force is transmitted from the rear end side of the crankshaft 5 to the cooling fan 9 through a belt 10.

An oil pan 11 is disposed on a lower surface of the cylinder block 6. A lubricant is stored in the oil pan 11. The lubricant in the oil pan 11 is suctioned by a lubricating oil pump (not shown) disposed on the side of the right side surface of the cylinder block 6, the lubricating oil pump being arranged in a coupling portion where the cylinder block 6 is coupled to the flywheel housing 7. The lubricant is then supplied to lubrication parts of the engine 1 through an oil cooler 13 and an oil filter 14 that are disposed on the right side surface of the cylinder block 6. The lubricant supplied to the lubrication parts is then returned to the oil pan 11. The lubricant pump is configured to be driven by rotation of the crankshaft 5.

Figure 4:
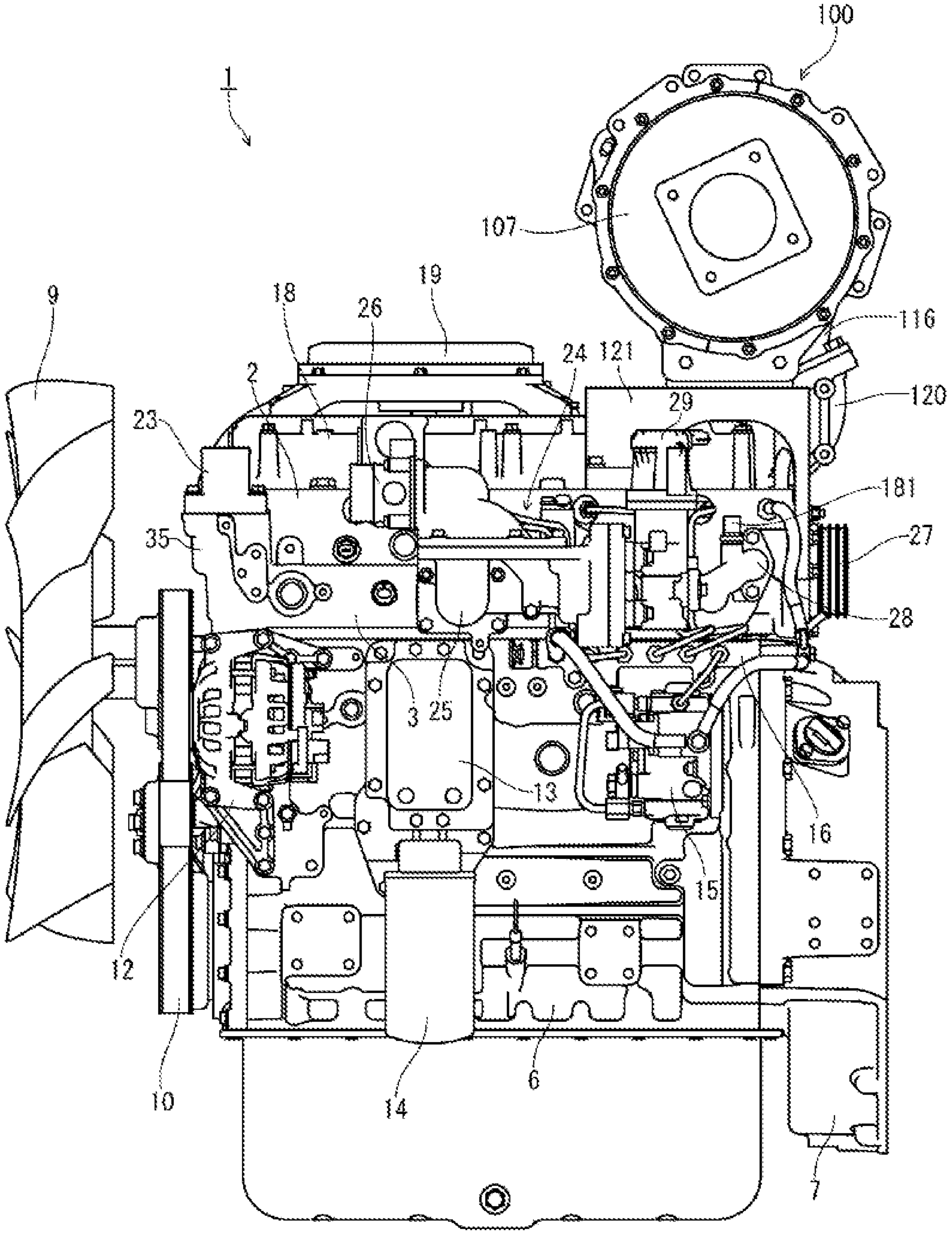
FIG. 4 is a schematic right side view of the same embodiment.

As shown in FIG. 4, on the right side portion of the engine 1, a fuel feed pump 15 for feeding a fuel is attached in the coupling portion where the cylinder block 6 is coupled to the flywheel housing 7. The fuel feed pump 15 is arranged below an EGR device 24. Further, between the air-intake manifold 3 and the fuel feed pump 15 of the cylinder head 2, a common rail 16 is arranged. The common rail 16 is fixed to a portion close to the upper front of the right side surface of the cylinder block 6. Injectors (not shown) for four cylinders are provided on an upper surface of the cylinder head 2 which is covered with a cylinder head cover 18. Each of the injectors has a fuel injection valve of electromagnetic-controlled type.

Each of the injectors is connected to a fuel tank (not shown) through the fuel feed pump 15 and the common rail 16 having a cylindrical shape. The fuel tank is mounted in a work vehicle. A fuel in the fuel tank is pressure-fed from the fuel feed pump 15 to the common rail 16, so that a high-pressure fuel is stored in the common rail 16. By controlling the opening/closing of the fuel injection valves of the injectors, the high-pressure fuel in the common rail 16 is injected from the injectors to the respective cylinders of the engine 1.

Figure 2:
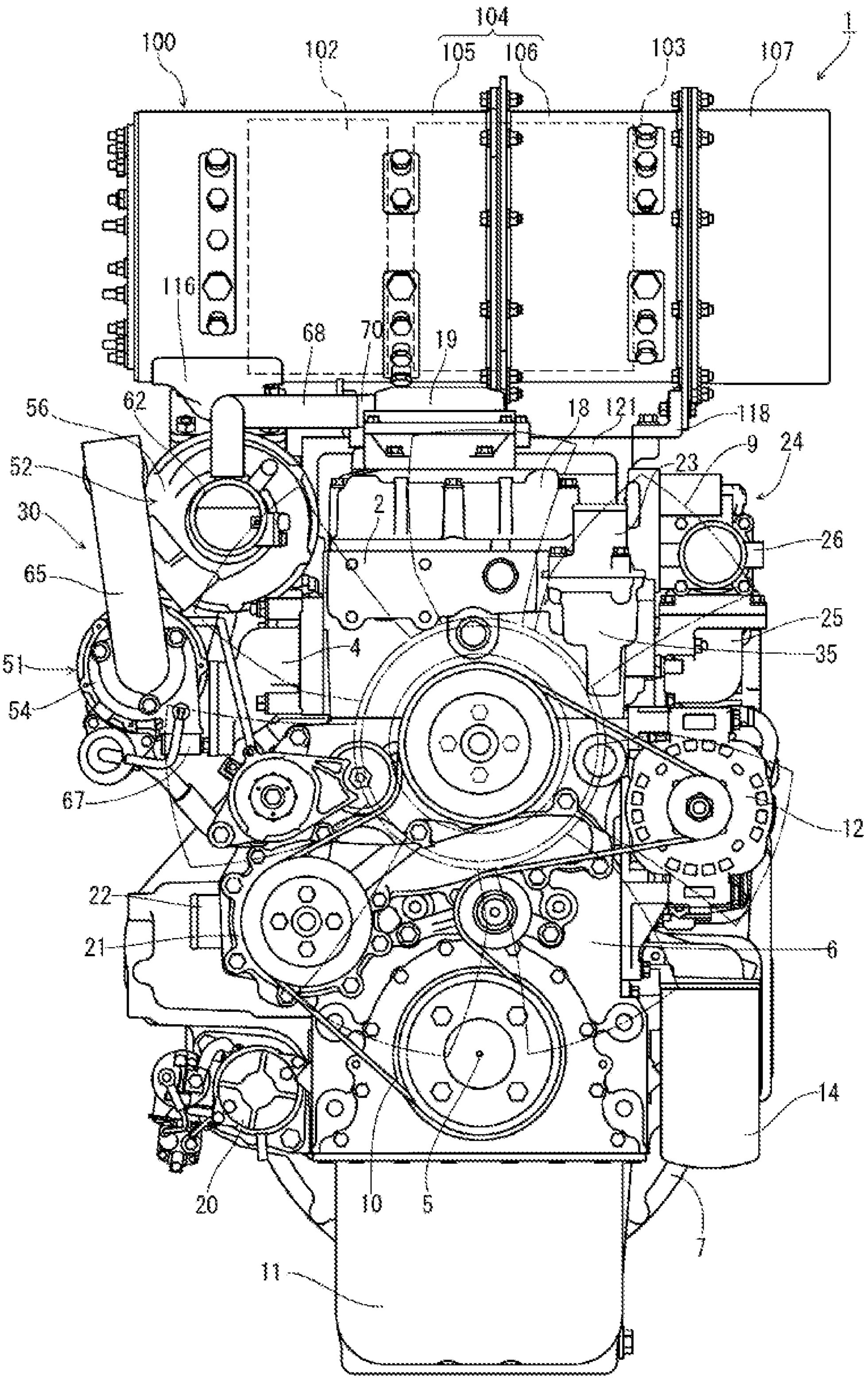
FIG. 2 is a schematic rear view of the same embodiment.
Figure 5:
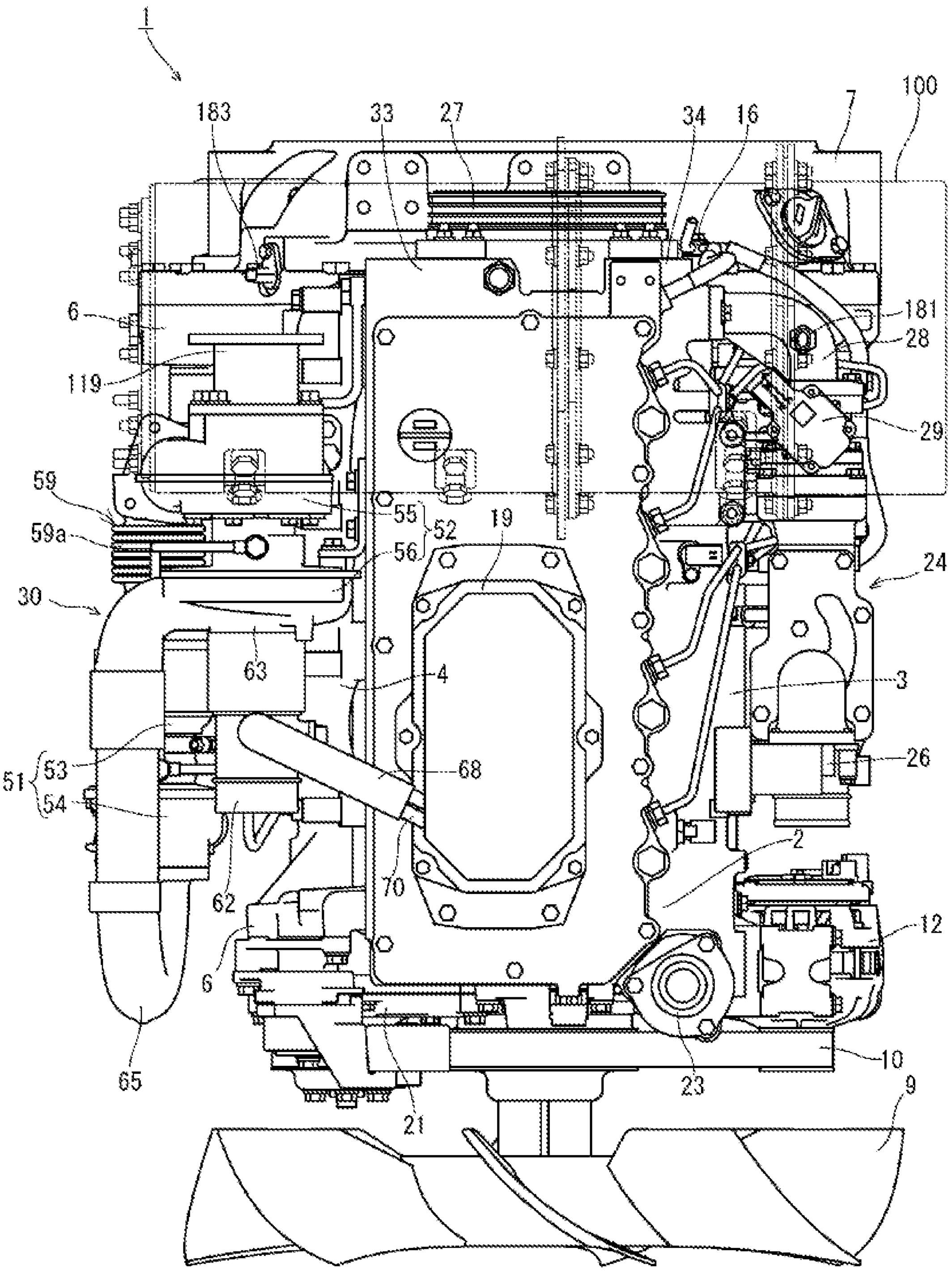
FIG. 5 is a schematic plan view of the same embodiment.

As shown in FIG. 2 and FIG. 5, a blow-by gas recirculation device 19 is provided on an upper surface of the cylinder head cover 18 covering air-intake valves and exhaust valves (not shown), etc. disposed on the upper surface of the cylinder head 2. The blow-by gas recirculation device 19 takes in a blow-by gas that has leaked out of a combustion chamber of the engine 1 or the like toward the upper surface side of the cylinder head 2. A blow-by gas outlet of the blow-by gas recirculation device 19 is in communication with an intake part of a two-stage turbocharger 30 through a recirculation hose 68. The blow-by gas, from which a lubricant component is removed in the blow-by gas recirculation device 19, is then recirculated to the air-intake manifold 3 through the two-stage turbocharger 30 and the like.

Figure 3:
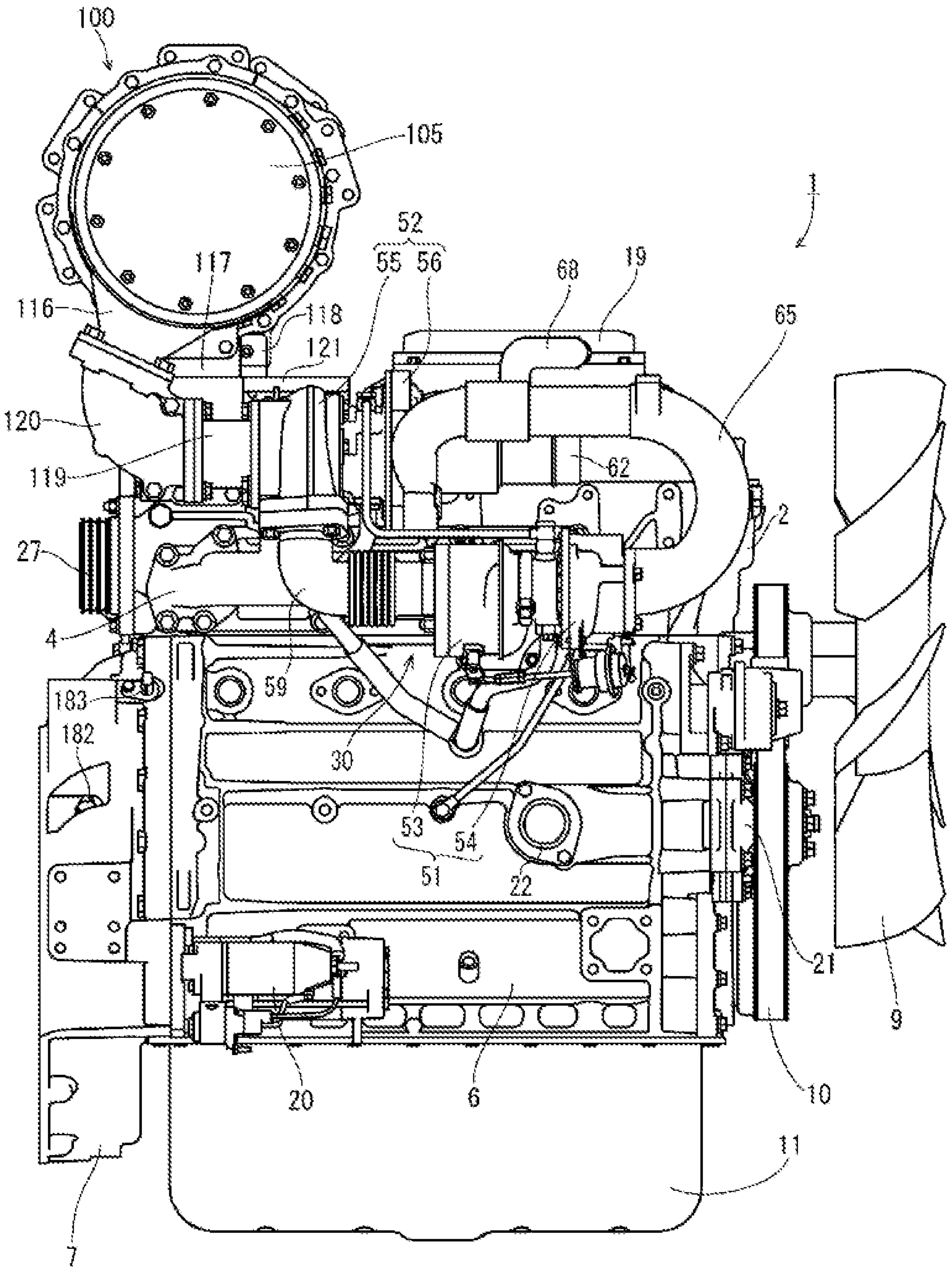
FIG. 3 is a schematic left side view of the same embodiment.

As shown in FIG. 3, on the left side portion of the engine 1, an engine starter 20 is attached to the flywheel housing 7. The engine starter 20 is disposed below the exhaust manifold 4. The engine starter 20 is attached to a left portion of the rear surface of the flywheel housing 7, in a position below the coupling portion where the cylinder block 6 is coupled to the flywheel housing 7.

As shown in FIG. 2, a cooling water pump 21 for cooling water lubrication is provided in a portion close to the left of the rear surface of the cylinder block 6. Further, on the right lateral side of the cooling water pump 21, an alternator 12 serving as an electric power generator configured to generate electric power with power of the engine 1 is provided. Rotary power is transmitted from the front end side of the crankshaft 5 to the cooling fan 9, the alternator 12, and the cooling water pump 21, through a belt 10. Driving the cooling water pump 21 causes cooling water in a radiator (not shown) mounted in the work vehicle to be supplied to the cooling water pump 21. The cooling water is then supplied into the cylinder head 2 and the cylinder block 6, to cool the engine 1.

As shown in FIG. 3, the cooling water pump 21 is disposed below the exhaust manifold 4. The cooling water inlet pipe 22 which is in communication with a cooling water outlet of the radiator is provided on the left side surface of the cylinder block 6 and is fixed at a height substantially equal to the height of the cooling water pump 21. A cooling water outlet pipe 23 that is in communication with the cooling water inlet of the radiator is fixed at a position close to the right rear portion of the upper surface of the cylinder head 2, as shown in FIG. 2 and FIG. 5. The cylinder head 2 has a cooling water drainage 35 at its right rear corner portion, and the cooling water outlet pipe 23 is installed on an upper surface of the cooling water drainage 35.

As shown in FIG. 4 and FIG. 5, the EGR device 24 is disposed on the right lateral side of the cylinder head 2. The EGR device 24 includes: a collector 25 serving as a relay pipe passage that mixes a recirculation exhaust gas of the engine 1 (an EGR gas from the exhaust manifold 4) with fresh air (outside air from the air cleaner), and supplies a mixed gas to the air-intake manifold 3; an air-intake throttle member 26 that communicates the collector 25 with the air cleaner; a recirculation exhaust gas pipe 28 that constitutes a part of a recirculation flow pipe passage connected to the exhaust manifold 4 via an EGR cooler 27; and an EGR valve member 29 that communicates the collector 25 with the recirculation exhaust gas pipe 28.

In the embodiment, the collector 25 of the EGR device 24 is coupled to the right side surface of the air-intake manifold 3 which is formed integrally with the cylinder head 2 to form the right side surface of the cylinder head 2. That is, an outlet opening of the collector 25 is coupled to an inlet opening of the air-intake manifold 3 provided on the right side surface of the cylinder head 2. An EGR gas inlet of the recirculation exhaust gas pipe 28 is coupled to an EGR gas outlet of the EGR gas passage provided in the cylinder head 2, in a position close to the front of the right side surface of the cylinder head 2. The EGR device 24 is fixed to the cylinder head 2, by attaching the collector 25 to the air-intake manifold 3, and attaching the recirculation exhaust gas pipe 28 to the cylinder head 2.

In the EGR device 24, the air-intake manifold 3 and the air-intake throttle member 26 for taking fresh air in are connected in communication with each other through the collector 25. With the collector 25, the EGR valve member 29 which leads to an outlet side of the recirculation exhaust gas pipe 28 is connected and communicated. The collector 25 is formed in a substantially cylindrical shape which is long in a front-rear direction. On a supplied-air inlet side (the front portion relative to the longitudinal direction) of the collector 25, the air-intake throttle member 26 is fastened by a bolt. A supplied-air exhaust side of the collector 25 is fastened, by a bolt, to the inlet side of the air-intake manifold 3. The EGR valve member 29 adjusts the opening degree of the EGR valve therein so as to adjust the supply amount of EGR gas to the collector 25.

In the collector 25, fresh air is supplied. Further, an EGR gas (a part of exhaust gas from the exhaust manifold 4) is supplied from the exhaust manifold 4 to the collector 25 through the EGR valve member 29. After the fresh air and the EGR gas from the exhaust manifold 4 are mixed in the collector 25, mixed gas in the collector 25 is supplied to the air-intake manifold 3. In this manner, the part of the exhaust gas discharged from the engine 1 to the exhaust manifold 4 is returned to the engine 1 from the air-intake manifold 3. Thus, the maximum combustion temperature at the time of high-load operation is reduced, and the amount of nitrogen oxide (NOx) from the engine 1 is reduced.

As shown in FIG. 1, FIG. 3 to FIG. 5, the EGR cooler 27 is fixed to the front side surface of the cylinder head 2. The cooling water and the EGR gas flowing in the cylinder head 2 flow into and out of the EGR cooler 27, and the EGR gas is cooled in the EGR cooler 27. A pair of left and right EGR cooler coupling portions 33, 34 for coupling the EGR cooler 27 is provided in a protruding manner to the front side surface of the cylinder head 2. To the front side surfaces of the EGR cooler coupling portions 33, 34, the EGR cooler 27 is coupled. That is, the EGR cooler 27 is disposed on the front side of the cylinder head 2 and at a position above the flywheel housing 7 such that a rear side surface of the EGR cooler 27 and the front side surface of the cylinder head 2 are spaced from each other.

As shown in FIG. 1 to FIG. 3, and FIG. 5, the two-stage turbocharger 30 is disposed on the left lateral side of the cylinder head 2. The two-stage turbocharger 30 includes a high-pressure turbocharger 51 and a low-pressure turbocharger 52. The high-pressure turbocharger 51 includes a high-pressure turbine case 53 in which a turbine wheel (not shown) is provided and a high-pressure compressor case 54 in which a blower wheel (not shown) is provided. The low-pressure turbocharger 52 includes a low-pressure turbine case 55 in which a turbine wheel (not shown) is provided and a low-pressure compressor case 56 in which a blower wheel (not shown) is provided.

In the exhaust path of the two-stage turbocharger 30, the high-pressure turbine case 53 is connected to the exhaust manifold 4. To the high-pressure turbine case 53, the low-pressure turbine case 55 is connected through a high-pressure exhaust gas pipe 59. To the low-pressure turbine case 55, an exhaust communication pipe 119 is connected. The high-pressure exhaust gas pipe 59 is formed of a flexible pipe. In this embodiment, a part of the high-pressure exhaust gas pipe 59 is formed in a bellows shape.

To the exhaust communication pipe 119, a tail pipe (not shown) is connected through an exhaust gas purification device 100. The exhaust gas discharged from each cylinder of the engine 1 to the exhaust manifold 4 is emitted from the tail pipe to the outside through the two-stage turbocharger 30, the exhaust gas purification device 100, and the like.

In an air-intake path of the two-stage turbocharger 30, the low-pressure compressor case 56 is connected to the air cleaner through an air supply pipe 62, the high-pressure compressor case 54 is coupled with the low-pressure compressor case 56 through a low-pressure fresh air passage pipe 65, and the air-intake throttle member 26 of the EGR device 24 is connected to the high-pressure compressor case 54 through an intercooler (not shown). The fresh air (outside air) suctioned by the air cleaner is subjected to dust removal and purification in the air cleaner, and fed to the air-intake manifold 3 through the two-stage turbocharger 30, the intercooler, the air-intake throttle member 26, the collector 25, and the like, and then supplied to the respective cylinders of the engine 1.

The exhaust gas purification device 100 is for collecting particulate matter (PM) and the like in the exhaust gas. As shown in FIG. 1 to FIG. 5, the exhaust gas purification device 100 has a substantially cylindrical shape elongated in a left-right direction intersecting the crankshaft 5 in plan view. In this embodiment, the exhaust gas purification device 100 is arranged above the front side surface of the cylinder head 2. The exhaust gas purification device 100 is supported by the front portion of the cylinder head 2, through a left support bracket 117, a right support bracket 118, and a support pedestal 121.

On both left and right sides (one end side relative to the longitudinal direction and the other end side relative to the longitudinal direction) of the exhaust gas purification device 100, an exhaust gas intake side and an exhaust gas discharge side are provided in a manner distributed to the left and right. The exhaust gas inlet pipe 116 on the exhaust gas intake side of the exhaust gas purification device 100 is connected to the exhaust gas outlet of the low-pressure turbine case 55 of the two-stage turbocharger 30, through an exhaust connecting member 120 having an exhaust gas passage having a substantially L-shape in a side view, and a linear exhaust communication pipe 119. The exhaust connecting member 120 is fixed to a left side surface of the support pedestal 121. The exhaust gas discharge side of the exhaust gas purification device 100 is connected to an exhaust gas intake side of the tail pipe (not shown).

The exhaust gas purification device 100 has a structure in which a diesel oxidation catalyst 102 made of platinum and the like for example and a soot filter 103 having a honeycomb structure are serially aligned and accommodated. In the above structure, nitrogen dioxide ($NO_2$) generated by an oxidation action of the diesel oxidation catalyst 102 is taken into the soot filter 103. The particulate matter contained in the exhaust gas from the engine 1 is collected by the soot filter 103, and is continuously oxidized and removed by the nitrogen dioxide. Therefore, in addition to removal of the particulate matter (PM) in the exhaust gas from the engine 1, content of carbon monoxide (CO) and hydrocarbon (HC) in the exhaust gas from the engine 1 is reduced.

The exhaust gas purification device 100 includes: an upstream case 105 having, on its outer circumferential surface, the exhaust gas inlet pipe 116; an intermediate case 106 coupled to the upstream case 105; and a downstream case 107 coupled to the intermediate case 106. The upstream case 105 and the intermediate case 106 are serially aligned and coupled to form a gas purification housing 104 made of a refractory metal material. In the gas purification housing 104, the diesel oxidation catalyst 102 and the soot filter 103 are accommodated over a cylindrical inner case (not shown). Further, the downstream case 107 has therein an inner case (not shown) having a large number of muffling holes, and a muffling material made of ceramic fibers is filled between the inner case and the downstream case 107 to form a muffler.

When the exhaust gas passes the diesel oxidation catalyst 102 and the soot filter 103, the nitrogen monoxide in the exhaust gas is oxidized to unstable nitrogen dioxide by the action of the diesel oxidation catalyst 102, provided that the exhaust gas temperature exceeds a renewable temperature (e.g., about 300° C.). Oxygen is released at the time of the nitrogen dioxide returning to nitrogen monoxide. With this oxygen, the particulate matter deposited on the soot filter 103 is oxidized and removed. This restores a particulate matter collection performance of the soot filter 103, thereby renewing the soot filter 103.

Next, with reference to FIG. 6 to FIG. 10 and the like, a structure and an attachment structure of the two-stage turbocharger 30 are described. The two-stage turbocharger 30 uses fluid energy of an exhaust gas discharged from the exhaust manifold 4, to compress fresh air which then flows into the air-intake manifold 3 of the cylinder head 2. The two-stage turbocharger 30 includes the high-pressure turbocharger 51 coupled to the exhaust manifold 4, and the low-pressure turbocharger 52 coupled to the high-pressure turbocharger 51.

Figure 7:
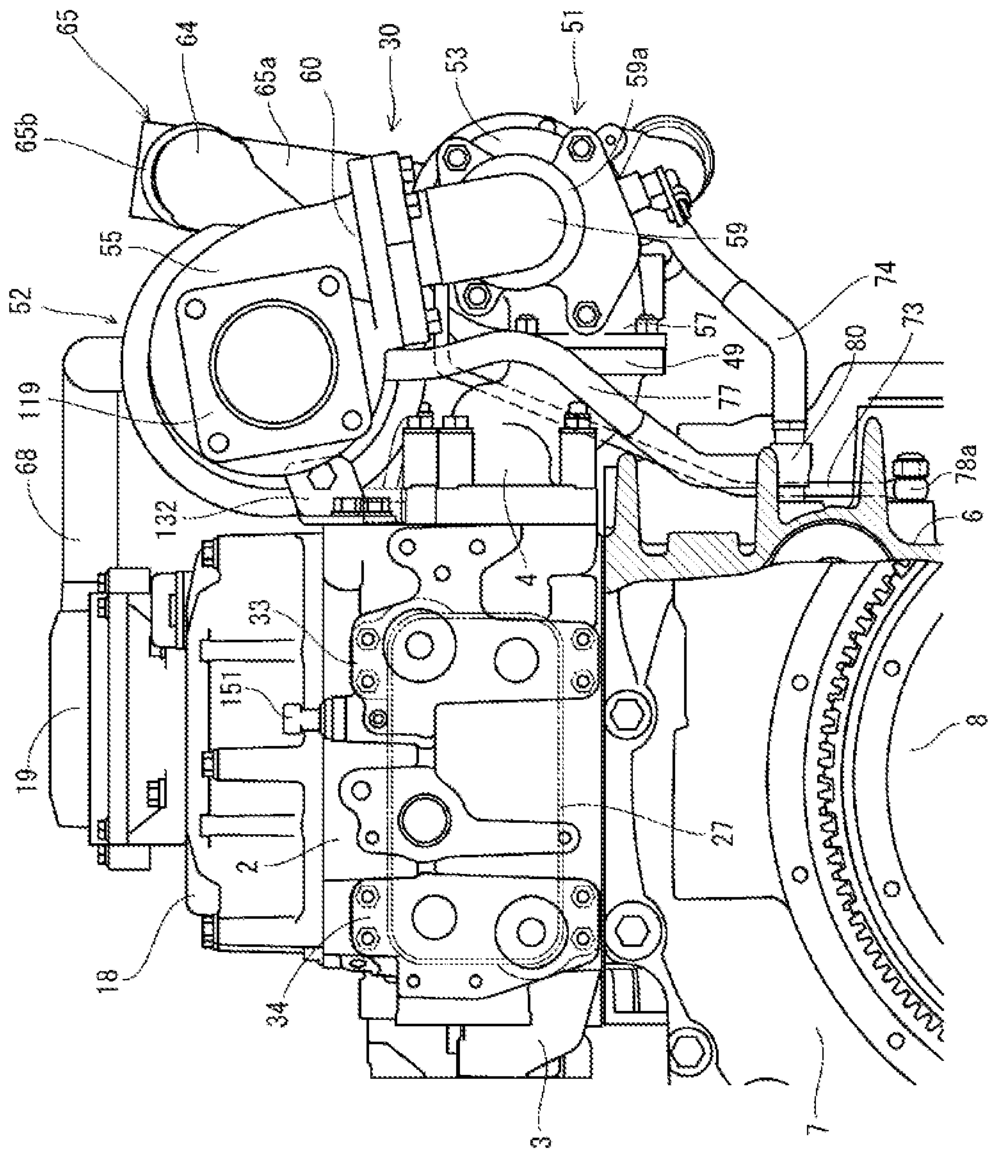
FIG. 7 is a schematic front view enlarging and showing the surroundings of the two-stage turbocharger.
Figure 8:
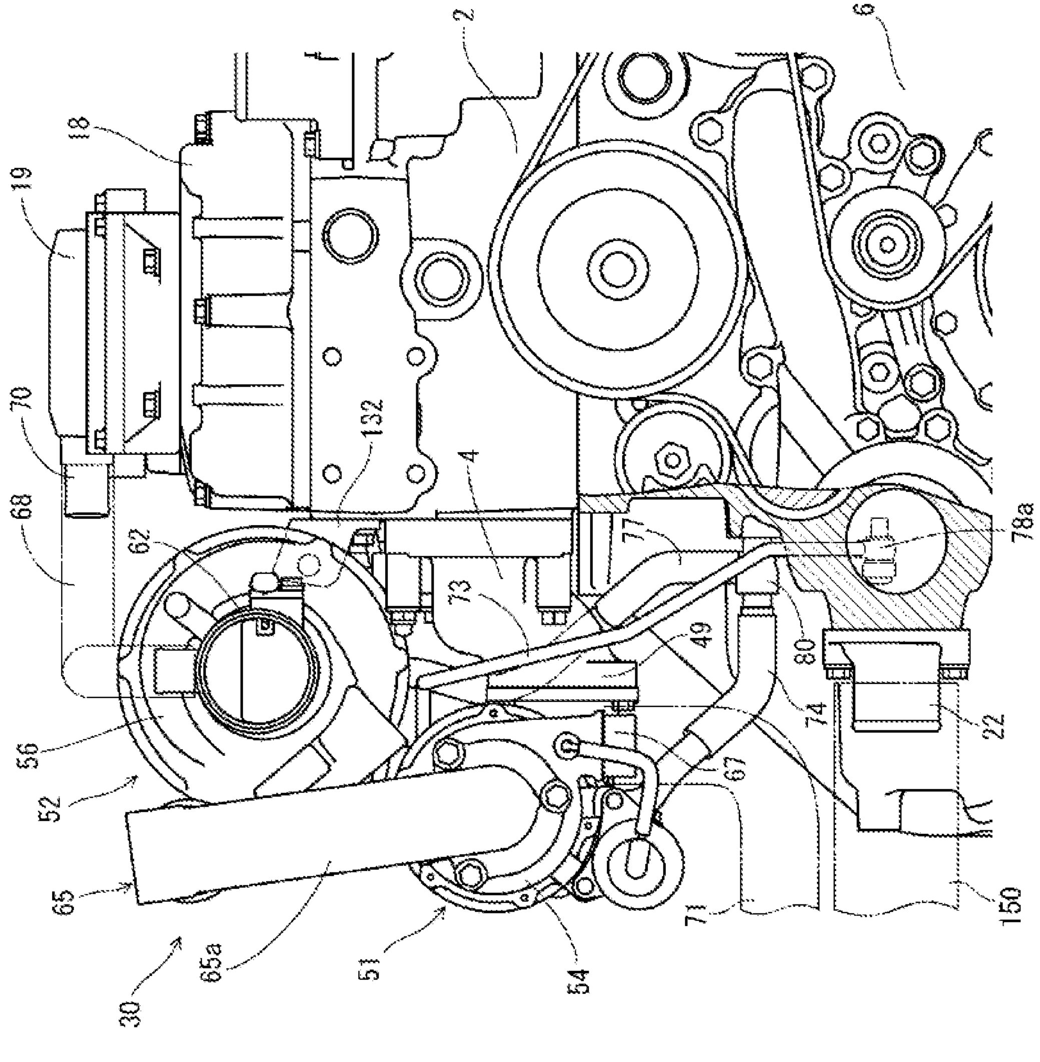
FIG. 8 is a schematic rear view enlarging and showing the surroundings of the two-stage turbocharger.

As shown in FIG. 7 and FIG. 8, the high-pressure turbocharger 51 is arranged on the left lateral side of the exhaust manifold 4. The low-pressure turbocharger 52 is arranged above the exhaust manifold 4. In other words, the high-pressure turbocharger 51 with a small capacity is arranged to face the left side surface of the exhaust manifold 4 whereas the low-pressure turbocharger 52 with a large capacity is disposed to face the left side surfaces of the cylinder head 2 and the cylinder head cover 18. This way, the exhaust manifold 4 and the two-stage turbocharger 30 can be compactly arranged in space on the left lateral side of the cylinder head 2, in a frame having a substantially quadrangular shape in a front and rear views, and a topmost portion of the two-stage turbocharger 30 can be positioned lower than a topmost portion of the engine 1. Such an arrangement can contribute to downsizing of the engine 1.

Figure 6:
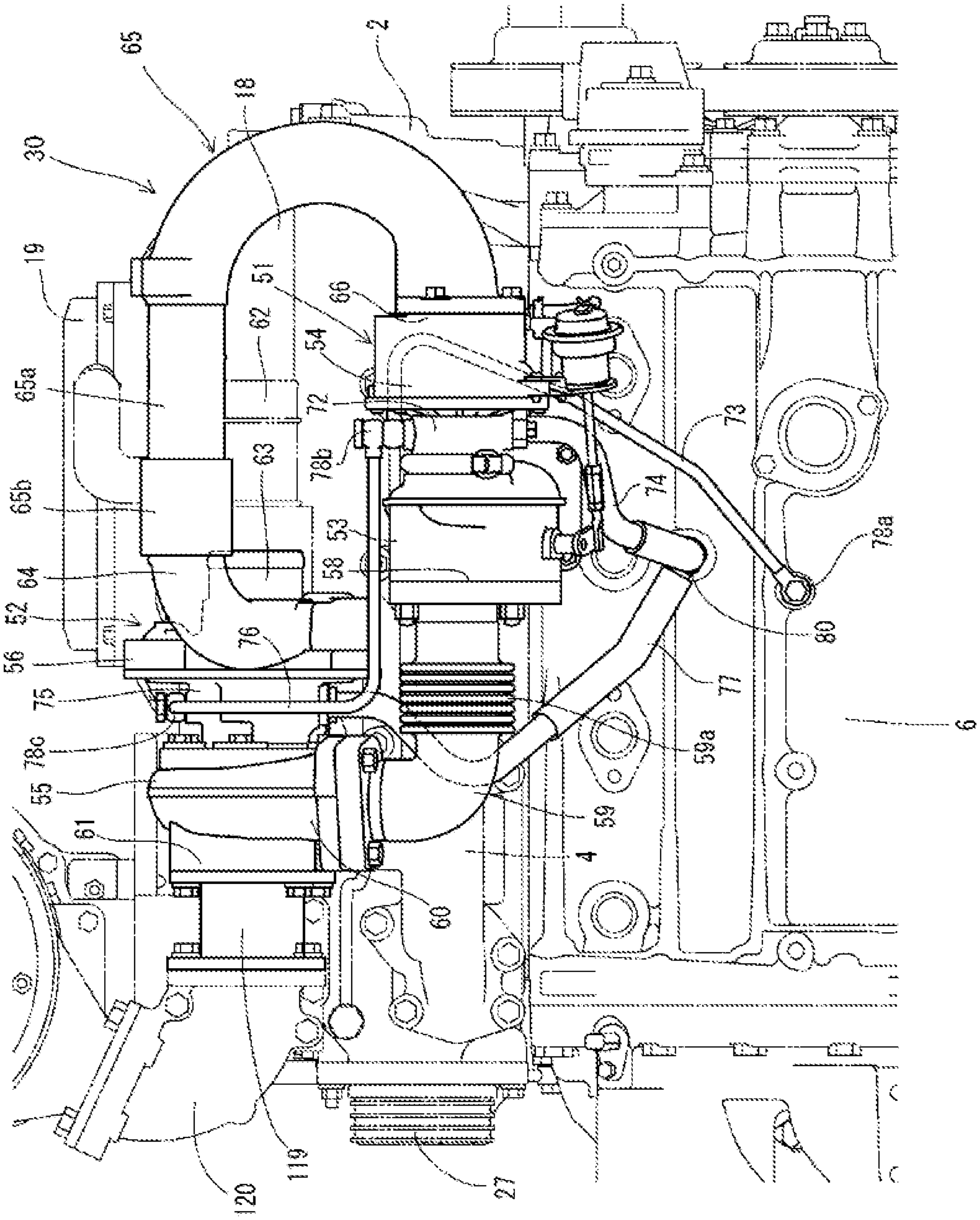
FIG. 6 is a schematic left side view enlarging and showing the surroundings of a two-stage turbocharger.

As shown in FIG. 3 and FIG. 6, when the engine 1 is viewed from the left side, the low-pressure turbocharger 52 is arranged on the left lateral side of the cylinder head 2, and further forward than the high-pressure turbocharger 51. Therefore, a space for arranging other application components can be broadened, around the front portion of the left side surface of the cylinder block 6, below the low-pressure turbocharger 52. For example, an external auxiliary machine such as a hydraulic pump operated by a rotational force of the crankshaft 5 can be arranged between the low-pressure turbocharger 52 and the engine starter 20.

As shown in FIG. 6 to FIG. 8 and the like, the high-pressure turbocharger 51 includes: the high-pressure turbine case 53; the high-pressure compressor case 54 arranged at the rear of the high-pressure turbine case 53; and a high-pressure center housing 72 joining both cases 53, 54. The high-pressure turbine case 53 includes: a high-pressure exhaust gas inlet 57 in communication with the exhaust manifold exhaust gas outlet 49 of the exhaust manifold 4; and a high-pressure exhaust gas outlet 58 in communication with an upstream end portion of the high-pressure exhaust gas pipe 59. The high-pressure compressor case 54 includes: a high-pressure fresh air inlet 66 in communication with the downstream end portion of the low-pressure fresh air passage pipe 65; and a high-pressure fresh air supply port 67 connected to the intercooler (not shown). The upstream end portion of the pipe means an end portion at upstream of the gas flow, and the downstream end portion means an end portion at downstream of the gas flow.

On the other hand, the low-pressure turbocharger 52 includes: the low-pressure turbine case 55; the low-pressure compressor case 56 arranged at the rear of the low-pressure turbine case 55; and a low-pressure center housing 75 joining both cases 55, 56. The low-pressure turbine case 55 includes: a low-pressure exhaust gas inlet 60 in communication with the downstream end portion of the high-pressure exhaust gas pipe 59; and a low-pressure exhaust gas outlet 61 in communication with the upstream end portion of the exhaust communication pipe 119. The low-pressure compressor case 56 includes: a low-pressure fresh air inlet 63 in communication with the downstream end portion of the air supply pipe 62; and a low-pressure fresh air supply port 64 in communication with the upstream end portion of the low-pressure fresh air passage pipe 65.

The exhaust manifold exhaust gas outlet 49 of the exhaust manifold 4, which discharges an exhaust gas, is opened toward the left lateral side. The high-pressure exhaust gas inlet 57 of the high-pressure turbine case 53 is opened toward the exhaust manifold 4, and the high-pressure exhaust gas outlet 58 of the high-pressure turbine case 53 is opened frontward. Further, the low-pressure exhaust gas inlet 60 of the low-pressure turbine case 55 is opened downward, and the low-pressure exhaust gas outlet 61 of the low-pressure turbine case 55 is opened frontward.

As shown in FIG. 6 to FIG. 8, in the two-stage turbocharger 30, the high-pressure compressor case 54 has its high-pressure fresh air inlet 66 opened rearward, and has its high-pressure fresh air supply port 67 opened downward. Further, the low-pressure compressor case 56 has its low-pressure fresh air inlet 63 opened rearward, and has its low-pressure fresh air supply port 64 protruding from the left lateral side and then directed rearward. To the high-pressure fresh air inlet 66, the downstream end portion of the U-shape low-pressure fresh air passage pipe 65 is coupled, and the low-pressure fresh air supply port 64 is coupled to the upstream end portion of the low-pressure fresh air passage pipe 65.

As shown in FIG. 6 to FIG. 8, the exhaust manifold exhaust gas outlet 49 of the exhaust manifold 4 and the high-pressure exhaust gas inlet 57 of the high-pressure turbine case 53 are bolt-coupled at a flange part. This way, the high-pressure turbocharger 51 is fixed to the robust exhaust manifold 4. While the high-pressure exhaust gas outlet 58 of the high-pressure turbine case 53 is bolt-coupled to the downstream end portion (rear end) of the substantially L-shaped high-pressure exhaust gas pipe 59, the low-pressure exhaust gas inlet 60 of the low-pressure turbine case 55 is bolt-coupled to the upstream end portion (upper end) of the high-pressure exhaust gas pipe 59, at the flange part. The substantially L-shape high-pressure exhaust gas pipe 59 is made of a flexible pipe, and its portion extended in the front-rear direction has a bellows portion 59*a* in the present embodiment.

Figure 9:
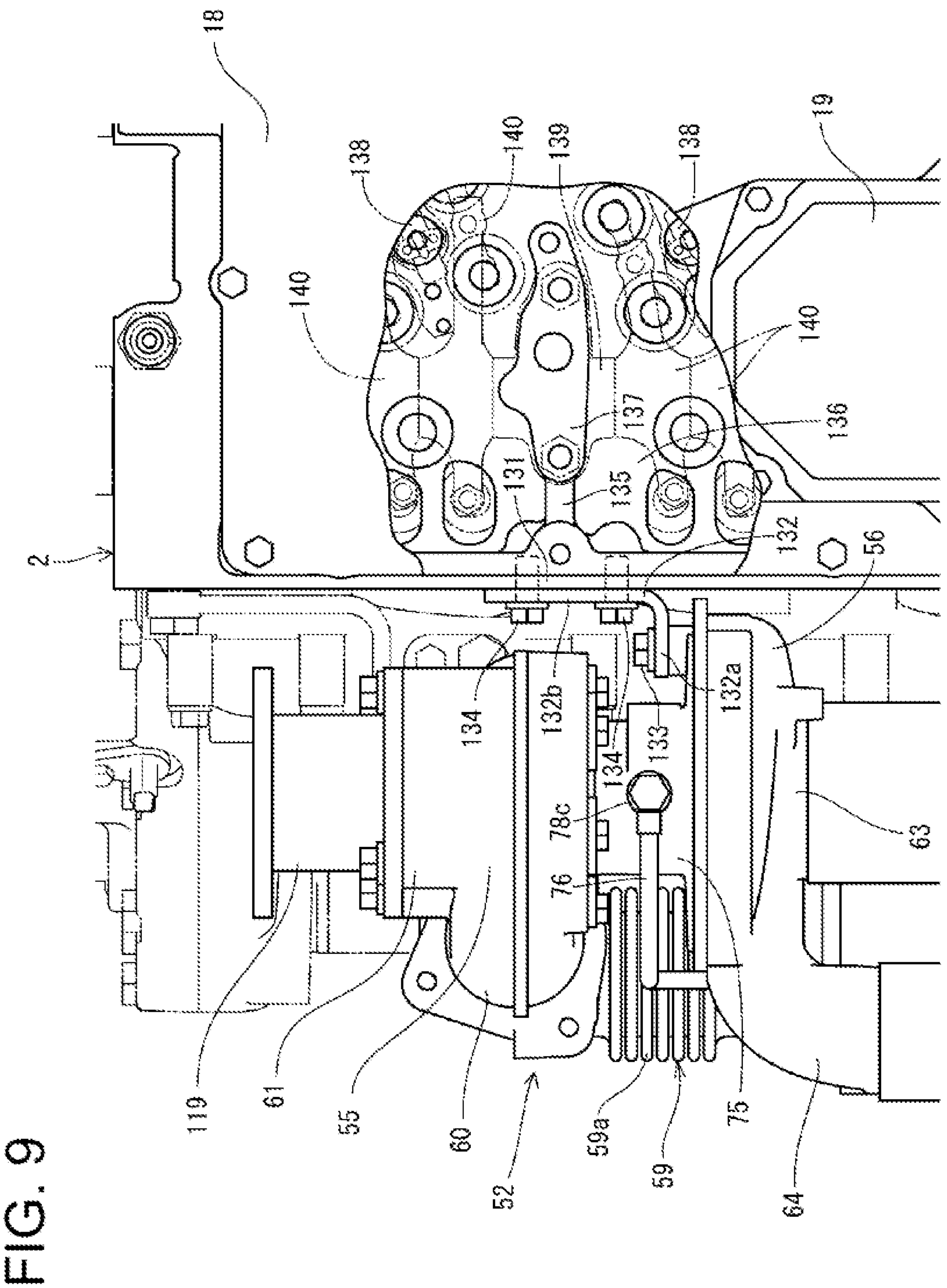
FIG. 9 is a schematic plan view showing surroundings of a low-pressure turbocharger enlarged and partially cutting away a cylinder head cover.
Figure 10:
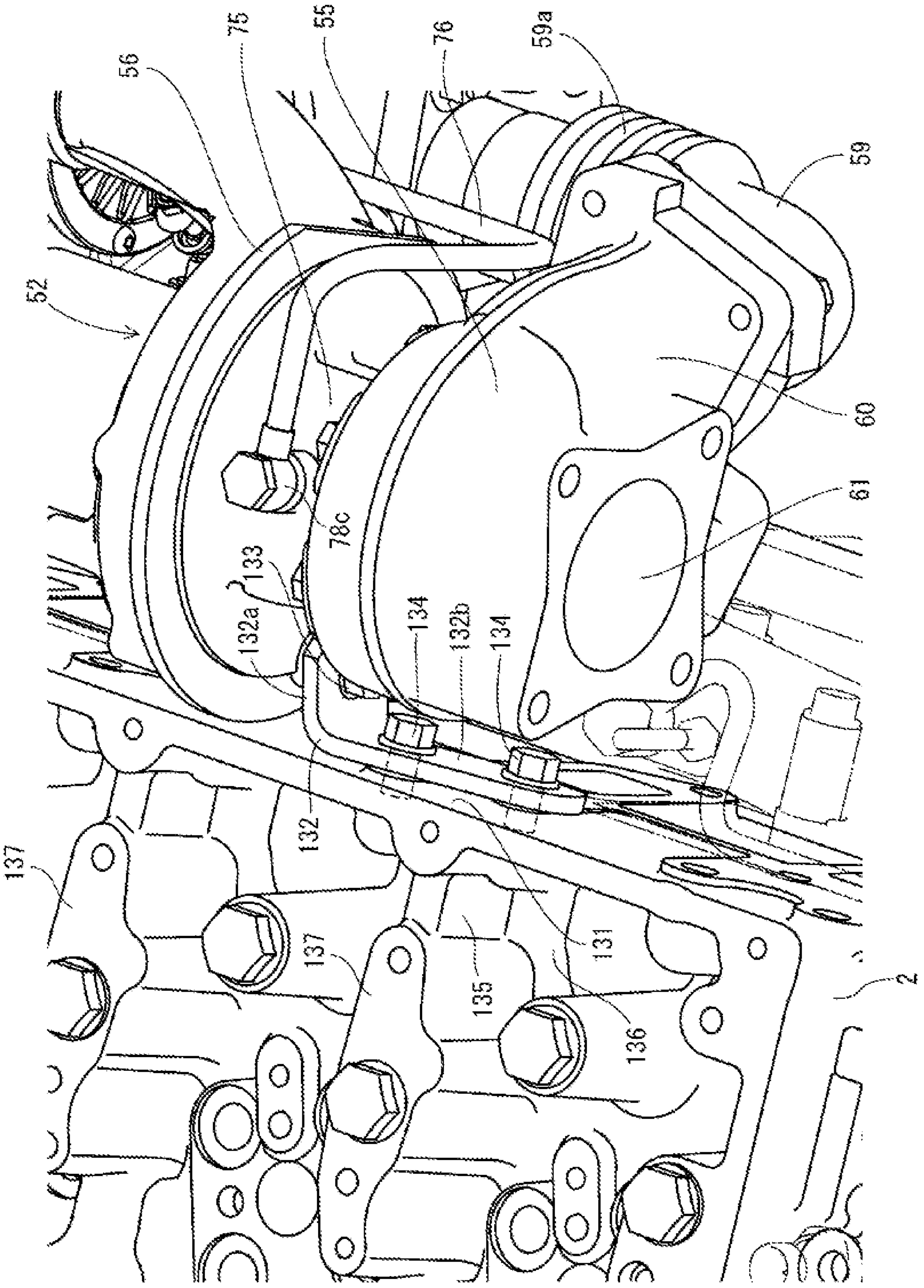
FIG. 10 is a schematic perspective view for explaining an attachment structure of the low-pressure turbocharger.

As shown in FIG. 9 and FIG. 10, the low-pressure turbocharger 52 is fixed to the left side surface (exhaust side surface) of the cylinder head 2. In this embodiment, a low-pressure turbocharger attaching part 131 is provided in a middle portion, close to the front of the left side surface of the cylinder head 2 (see also FIG. 12, FIG. 16, and FIG. 19). The low-pressure turbocharger attaching part 131 is provided above the exhaust manifold 4 in such a manner as to face the low-pressure turbine case 55. The low-pressure turbocharger 52 is attached to the low-pressure turbocharger attaching part 131 through a substantially L-shaped attachment bracket 132. The attachment bracket 132 includes a turbocharger-side plane portion 132*a* extending in the left-right direction, and a head-side plane portion 132*b* protruding forward from the right end of the turbocharger-side plane portion 132*a*.

The turbocharger-side plane portion 132*a* of the attachment bracket 132 is fixed to a right edge portion of the front side surface of the low-pressure compressor case 56 by a bolt 133. To the low-pressure turbocharger attaching part 131, the head-side plane portion 132*b* of the attachment bracket 132 is fixed by a pair of front and rear bolts 134. This way, the low-pressure turbocharger 52 is fixed to the robust cylinder head 2.

In this embodiment, since the low-pressure turbocharger 52 is fixed to the left side surface (the exhaust side surface) of the cylinder head 2 and the high-pressure turbocharger 51 is fixed to the exhaust manifold 4, the high-pressure turbocharger 51 and the low-pressure turbocharger 52 constituting the two-stage turbocharger 30 can be distributed to and firmly fixed to the robust cylinder head 2 and the exhaust manifold 4. Further, since the low-pressure turbocharger 52 is coupled to the support pedestal 121 fixed to the front portion of the cylinder head 2 through the exhaust communication pipe 119 and the exhaust connecting member 120, the low-pressure turbocharger 52 can be reliably fixed to the engine 1, and the two-stage turbocharger 30 can be therefore reliably fixed to the engine 1.

Further, since the high-pressure exhaust gas outlet 58 of the high-pressure turbocharger 51 and the low-pressure exhaust gas inlet 60 of the low-pressure turbocharger 52 are coupled through a flexible high-pressure exhaust gas pipe 59, the risk of low cycle fatigue breakdown of the high-pressure exhaust gas pipe 59 due to thermal expansion can be reduced. Further, a stress to the two-stage turbocharger 30, attributed to thermal expansion of the high-pressure exhaust gas pipe 59, can be reduced. As a result, a stress applied to a coupling portion of the high-pressure turbocharger 51 and the exhaust manifold 4, and a stress applied to a coupling portion of the low-pressure turbocharger 52 and the cylinder head 2 can be reduced, and coupling failure at these coupling portions and damages to coupling members can be suppressed or reduced.

As shown in FIG. 9 and FIG. 10, the cylinder head 2 has therein a rib 135 extended from the low-pressure turbocharger attaching part 131 toward the right side surface (air-intake side surface) of the cylinder head 2. The rib 135 protrudes upward from a cylinder head bottom surface 136. With this, the rigidity of the cylinder head 2 nearby the low-pressure turbocharger attaching part 131 can be improved, and deformation and the like of the cylinder head 2 which is caused by attaching the low-pressure turbocharger 52 to the cylinder head 2 can be suppressed or reduced. Further, on the cylinder head bottom surface 136, a rocker arm mechanism mounting seat 137 extending in the left-right direction is provided to protrude upward from the right end portion of the rib 135. This can improve the rigidity of the rib 135, which in turn can improve the rigidity around the low-pressure turbocharger attaching part 131.

In this embodiment, the engine 1 is an OHV type, and the space surrounded by the cylinder head 2 and the cylinder head cover 18 serves as a rocker arm chamber. As shown in FIG. 9, injectors 138 and valve gear structures are accommodated in this rocker arm chamber. A plurality of rocker arm mechanism mounting seats 137 are arranged in the front-rear direction at regular intervals, and a rocker arm shaft support part 139 supporting a rocker arm shaft (not shown) is arranged on each rocker arm mechanism mounting seat 137, and a plurality of rocker arms 140 are pivotally and swingably supported by the rocker arm shaft. The rocker arm 189 swings about the rocker arm shaft to open and close the air-intake valve and the exhaust valve (not shown) of each cylinder.

As shown in FIG. 3, FIG. 5, and FIG. 6, the low-pressure turbocharger 52 is arranged close to the front side surface (first side surface) of the cylinder head 2 as viewed from the left side, while the low-pressure exhaust gas outlet 61 of the low-pressure turbine case 55 is provided toward the front side surface side of the cylinder head 2. Further, the exhaust gas inlet pipe 116 constituting the exhaust gas inlet of the exhaust gas purification device 100 is arranged nearby a corner portion where the front side surface and the right side surface (exhaust side surface) of the cylinder head 2 intersect. Therefore, the exhaust communication pipe 119 and the exhaust connecting member 120 serving as piping connecting the low-pressure exhaust gas outlet 61 of the low-pressure turbocharger 52 and the exhaust gas inlet pipe 116 of the exhaust gas purification device 100 can be shortened and simplified. This way, the exhaust gas supplied to the exhaust gas purification device 100 can be kept at a high temperature, and a drop in the regeneration performance of the exhaust gas purification device 100 can be suppressed or reduced.

In the present invention, effects similar to those of the present embodiment can be achieved, irrespective of the position and direction in which the exhaust gas purification device 100 is mounted, provided that the exhaust gas inlet of the exhaust gas purification device 100 is arranged nearby a corner portion where the front side surface (first side surface) and the left side surface (exhaust side surface) of the cylinder head 2 intersect. For example, the exhaust gas purification device 100 may be arranged in front of the cylinder head 2 and above the flywheel housing 7, in such a manner as to take a posture that is long in the left-right direction (e.g., see Japanese Patent Application Laid-Open No. 2011-012598), or arranged above the cylinder head 2, in such a manner as to take a posture that is long in the front-rear direction (in a direction along the crankshaft 5) (e.g., see Japanese Patent Application Laid-Open No. 2016-079870).

As shown in FIG. 3, FIG. 5, and FIG. 6, the blow-by gas recirculation device 19 for taking a blow-by gas in is installed above the cylinder head 2. The blow-by gas recirculation device 19 is placed on and fixed to the upper surface of the cylinder head cover 18 that covers the upper surface of the cylinder head 2. Above the cylinder head 2, a blow-by gas outlet 70 of the blow-by gas recirculation device 19 is arranged and directed toward the left side surface, in a position close to the rear surface of the cylinder head 2 (second side surface). Further, the low-pressure fresh air inlet 63 of the low-pressure compressor case 56 of the low-pressure turbocharger 52 is opened rearward. The low-pressure fresh air inlet 63 is coupled to the air supply pipe 62 extended in the front-rear direction. This way, the air supply pipe 62 can be arranged nearby the blow-by gas outlet 70, and the recirculation hose 68 connecting the blow-by gas outlet 70 with the air supply pipe 62 can be shortened, and hence freezing the inside of the recirculation hose 68 under a low-temperature environment can be avoided.

As shown in FIG. 6, the low-pressure compressor case 56 and the high-pressure compressor case 54 have the low-pressure fresh air inlet 63, the low-pressure fresh air supply port 64, and the high-pressure fresh air inlet 66 open in the same direction (rearward). This makes it easier to couple the air supply pipe 62 communicating with the air cleaner to the low-pressure fresh air inlet 63, and couple the low-pressure fresh air passage pipe 65 to the low-pressure fresh air supply port 64 and the high-pressure fresh air inlet 66. Therefore, the workability of assembling can be improved.

The low-pressure fresh air passage pipe 65 includes a metal pipe 65*a* and a resin pipe 65*b*. The metal pipe 65*a* has a substantially U-shape and has its one end flange-coupled and bolt-fastened to the high-pressure fresh air inlet 66. The resin pipe 65*b* allows the other end of the metal pipe 65*a* to communicate with the low-pressure fresh air supply port 64 of the low-pressure compressor case 56. This way, in the low-pressure fresh air passage pipe 65, the metal pipe 65*a* can be fixed to the high-pressure compressor case 54 with a high rigidity, and the resin pipe 65*b* can communicate the low-pressure compressor case 56 with the metal pipe 65*a* while lessening an assembling error therebetween.

Further, the low-pressure fresh air supply port 64 of the low-pressure compressor case 56 extends obliquely upper left from a lower left portion of the outer circumferential surface of the low-pressure compressor case 56, and is bent rearward. Therefore, the low-pressure fresh air passage pipe 65 (metal pipe 65*a*) can be bent with a large curvature. Therefore, generation of a turbulent flow in the low-pressure fresh air passage pipe 65 can be suppressed, so that the compressed air discharged from the low-pressure compressor case 56 can be smoothly supplied to the high-pressure compressor case 54.

As shown in FIG. 8, the high-pressure turbocharger 51 includes the fresh air supply port 64 extended downward, in a lower portion close to the right of the outer circumferential surface of the high-pressure compressor case 54. The high-pressure compressor case 54 is coupled to a high-pressure fresh air passage pipe 71 in communication with the intercooler, and supplies compressed air to the intercooler through the high-pressure fresh air passage pipe 71. The cooling water inlet pipe 22 which is opened laterally leftward is provided below the high-pressure compressor case 54. The cooling water inlet pipe 22 is connected to a cooling water pipe 150 which leads to the radiator. As a result, pipe routing for the high-pressure fresh air passage pipe 71 and the cooling water pipe 150 can be collected, which can simplify a piping structure in a main machine equipped with the engine 1 and also can make an assembling work and a maintenance work easy.

Further, as shown in FIG. 2, FIG. 4, and FIG. 5, in the engine 1, the cooling water outlet pipe 23, the air supply pipe 62, and the air-intake throttle member 26 are arranged at its rear portion (on the cooling fan 9 side). In the main machine equipped with this engine 1, therefore, when the radiator, the air cleaner, and the intercooler which use cooling air of the cooling fan 9 are arranged on the rear side of the cooling fan 9, cooling water pipe connected to the radiator and fresh air pipe communicating with the air cleaner and the intercooler can be shortened, and moreover works for connecting such pipes can be performed together. As a result, an assembling work and a maintenance work in the main machine can be performed with ease, and in addition, component parts to be coupled to the engine 1 can be efficiently arranged in the main machine.

As shown in FIG. 6 to FIG. 8, in the high-pressure turbocharger 51, a high-pressure lubricant supply pipe 73 and a high-pressure lubricant return pipe 74 are coupled to upper and lower portions of the outer circumferential surface of a high-pressure center housing 72 which is a coupling portion where the high-pressure turbine case 53 and the high-pressure compressor case 54 are coupled to each other. In the low-pressure turbocharger 52, a low-pressure lubricant supply pipe 76 and a low-pressure lubricant return pipe 77 are coupled to upper and lower portions of the outer circumferential surface of a low-pressure center housing 75 which is a coupling portion where the low-pressure turbine case 55 and the low-pressure compressor case 56 are coupled to each other.

The high-pressure lubricant supply pipe 73 has its lower end connected to a connection member 78*a* disposed in a middle portion on the left side surface of the cylinder block 6, and its upper end coupled to the upper portion of the high-pressure center housing 72 of the high-pressure turbocharger 51. A coupling joint 78*b* is provided in the upper portion of the high-pressure center housing 72, the coupling joint 78*b* allowing the upper end of the high-pressure lubricant supply pipe 73 to communicate with a lower end of the low-pressure lubricant supply pipe 76. An upper end of the low-pressure lubricant supply pipe 76 is coupled to a connecting member 78*c* provided at an upper portion of the low-pressure center housing 75 of the low-pressure turbocharger 52. This way, the lubricant flowing in the oil passage in the cylinder block 6 is supplied to the high-pressure center housing 72 of the high-pressure turbocharger 51 through the high-pressure lubricant supply pipe 73, and is supplied to the low-pressure center housing 75 of the low-pressure turbocharger 52 through the high-pressure lubricant supply pipe 73 and the low-pressure lubricant supply pipe 76.

The high-pressure lubricant supply pipe 73 extends obliquely upper rearward from the connection member 78*a* on the left side surface of the cylinder block 6, and passes between the high-pressure compressor case 54 and the cylinder block 6, to a position facing the left side surface of the cylinder head 2. Further, the high-pressure lubricant supply pipe 73 bypasses the rear end portion of the exhaust manifold 4, passes the right lateral side of the high-pressure center housing 72, and leads to the coupling joint 78*b*. Further, the low-pressure lubricant supply pipe 76 has a substantially L-shape in a side view, and extends from the coupling joint 78*b* to the connecting member 78*c* along the high-pressure turbocharger 51 and the high-pressure exhaust gas pipe 59. Such a piping layout surrounding the two-stage turbocharger 30 which is a high-rigidity component with the lubricant supply pipes 73, 76 shortened enables the lubricant to be efficiently supplied to the two-stage turbocharger 30 and simultaneously prevents the lubricant supply pipes 73, 76 from being damaged by an external force.

Further, the high-pressure lubricant return pipe 74 has one end (lower end) connected to a leading end surface of a coupling joint 80 provided in a middle portion of the left side surface of the cylinder block 6, above the connection member 78*a*. The other end (upper end) of the high-pressure lubricant return pipe 74 is coupled to a lower portion of the outer circumferential surface of the high-pressure center housing 72 of the high-pressure turbocharger 51. Further, the low-pressure lubricant return pipe 77 has one end (lower end) connected to a connecting part that protrudes in an obliquely upper forward direction from a midway portion of the coupling joint 80. The other end (upper end) of the low-pressure lubricant return pipe 77 is coupled to a lower portion of the outer circumferential surface of the low-pressure center housing 75 of the low-pressure turbocharger 52. Therefore, the lubricant flowing in the high-pressure turbocharger 51 and the low-pressure turbocharger 52 flows from the lower portion of the center housings 72, 75 through the lubricant return pipes 74, 77, merged in the coupling joint 80, and returned to the oil passage in the cylinder block 6.

The high-pressure lubricant return pipe 74 extends from below the high-pressure turbine case 53, passes below the exhaust manifold exhaust gas outlet 49 of the exhaust manifold 4, and leads to the coupling joint 80. Further, the low-pressure lubricant return pipe 77 passes between the high-pressure exhaust gas pipe 59 and the exhaust manifold 4, and leads to the coupling joint 80. Such a piping layout surrounding the two-stage turbocharger 30 which is a high-rigidity component with the lubricant return pipes 74, 77 shortened enables the lubricant to be efficiently supplied to the two-stage turbocharger 30 and simultaneously prevents the lubricant return pipes 74, 77 from being damaged by an external force.

Next, the following describes a structure of attaching the exhaust gas purification device 100 with reference to FIG. 11 to FIG. 16 and the like. The exhaust gas purification device 100 is structured so that the upstream case 105, the intermediate case 106, and the downstream case 107 are serially coupled in this order, and is arranged above the front portion of the cylinder head 2 in such a manner as to be long in the left-right direction.

The coupling portion of the upstream case 105 and the intermediate case 106 are connected by a pair of thick plate-like sandwiching flanges 108, 109 from both sides relative to the direction in which the exhaust gas moves. That is, a coupling flange at a downstream side opening edge of the upstream case 105 and a coupling flange at an upstream side opening edge of the intermediate case 106 are sandwiched by the sandwiching flanges 108, 109 to join together the downstream side of the upstream case 105 with the upstream side of the intermediate case 106, thereby structuring the gas purification housing 104. At this time, by bolt-fastening the sandwiching flanges 108, 109, the upstream case 105 and the intermediate case 106 are detachably coupled.

The coupling portion of the intermediate case 106 and the downstream case 107 are connected by a pair of thick plate-like sandwiching flanges 110, 111 from both sides relative to the direction in which the exhaust gas moves. That is, a coupling flange at a downstream side opening edge of the intermediate case 106 and a coupling flange at an upstream side opening edge of the downstream case 107 are sandwiched by the sandwiching flanges 110, 111 to join together the downstream side of the intermediate case 106 with the upstream side of the downstream case 107.

Figure 11:
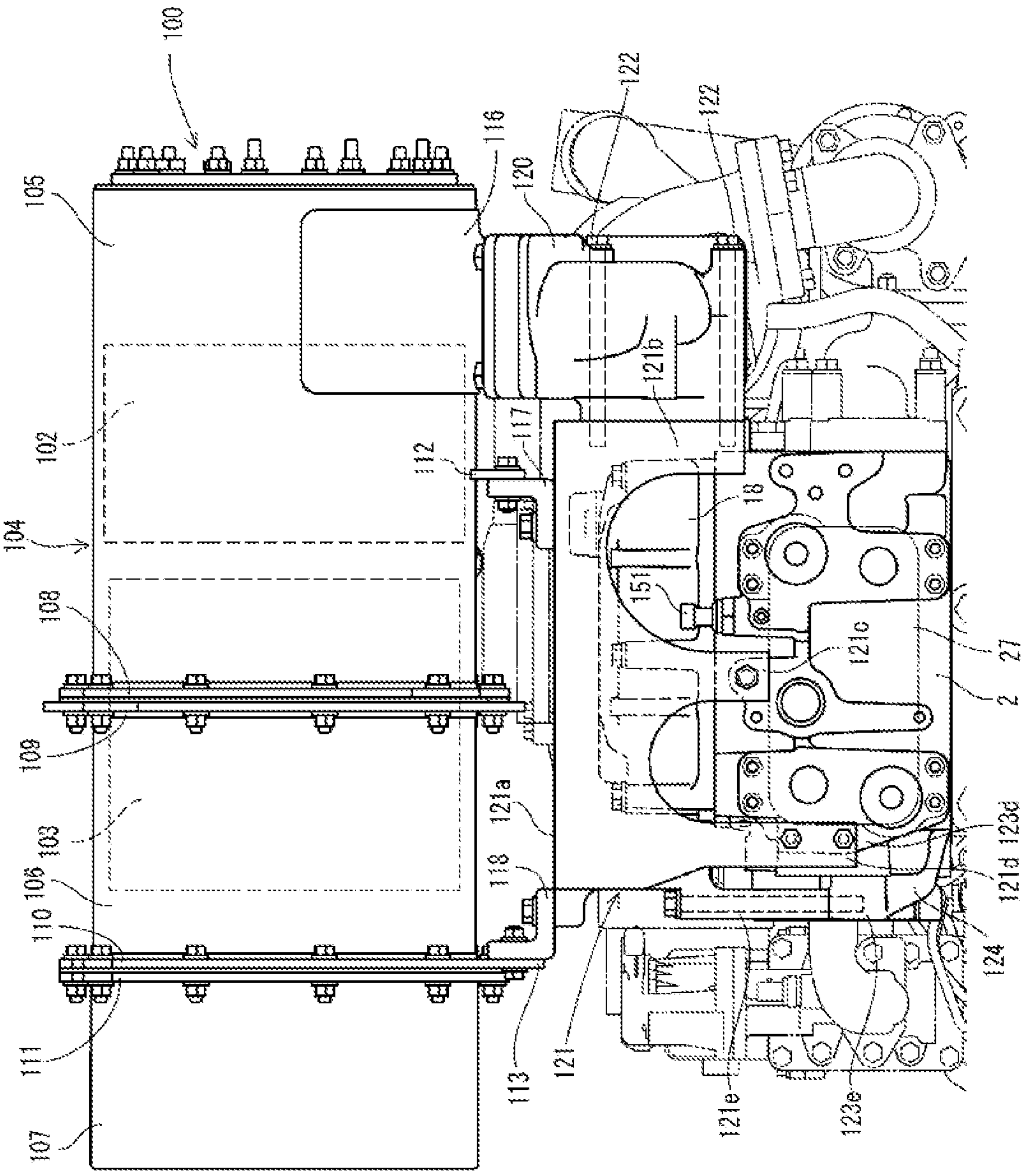
FIG. 11 is a schematic front view enlarging and showing surroundings of a support pedestal which supports an exhaust gas purification device.
Figure 12:
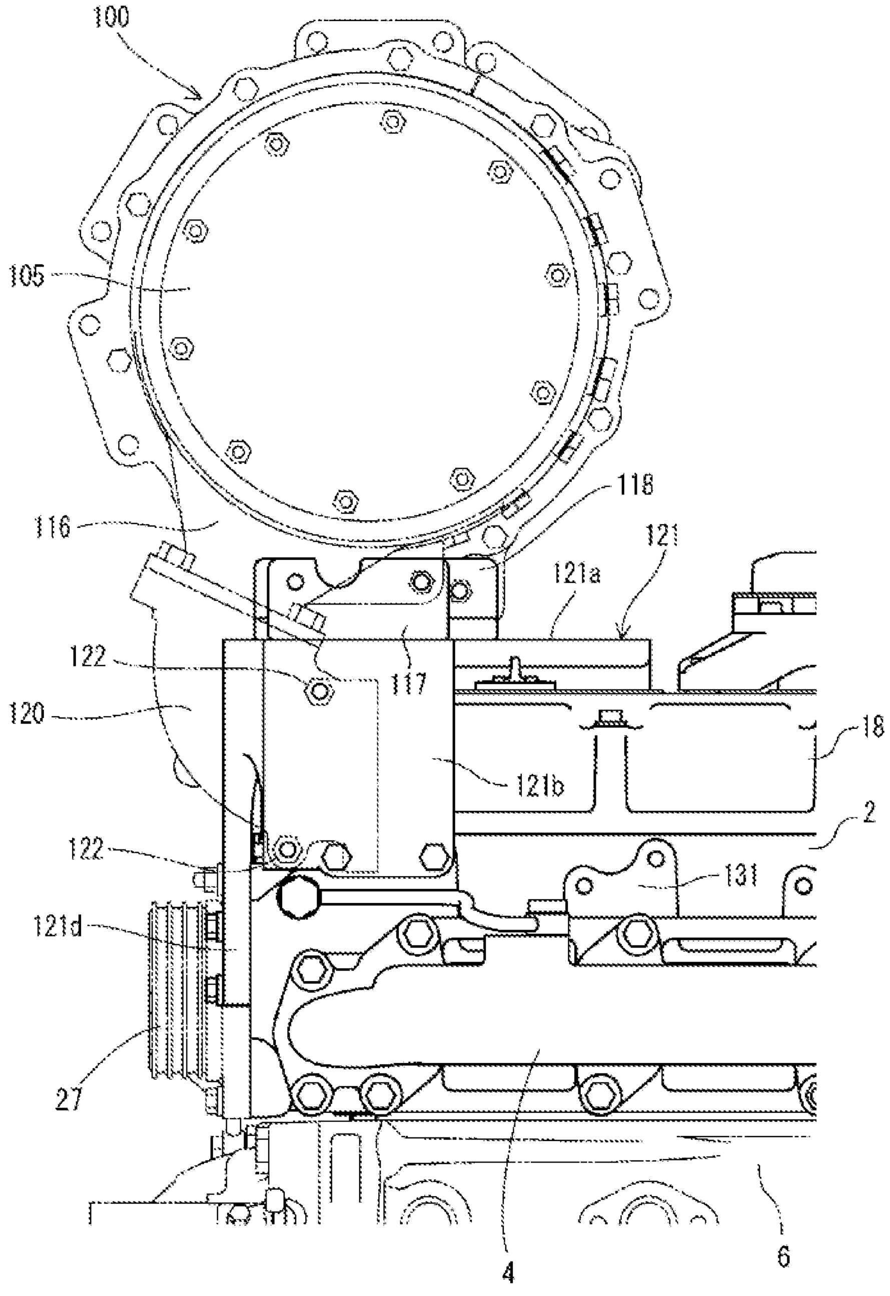
FIG. 12 is a schematic left side view enlarging and showing the surroundings of the same support pedestal.
Figure 16:
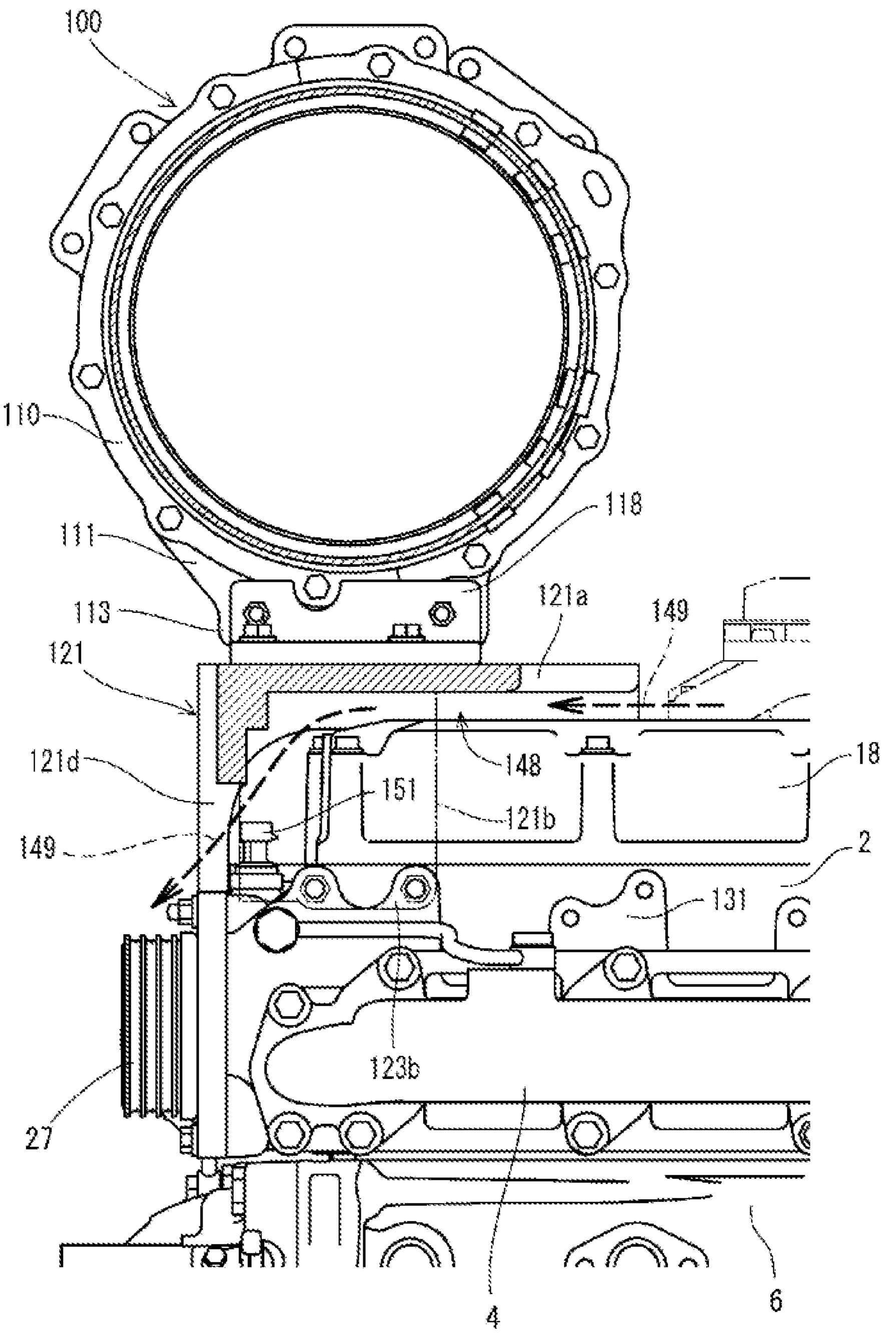
FIG. 16 is a schematic left side view of the same support pedestal and the exhaust gas purification device, which are shown in the form of cross section taken along the line 16-16 in FIG. 14.

The exhaust gas inlet pipe 116 is provided at an outer peripheral portion on an exhaust gas inlet side of the upstream case 105. The exhaust gas intake side of the exhaust gas inlet pipe 116 communicates with the low-pressure exhaust gas outlet 61 (see FIG. 6 and the like) of the two-stage turbocharger 30 through the exhaust connecting member 120 and the exhaust communication pipe 119 serving as an exhaust gas relay passage. The exhaust connecting member 120 is formed in a substantially L-shape in a side view, and has an exhaust gas intake side at its rear and an exhaust gas discharge side at its upper portion. The exhaust gas intake side connects to the exhaust communication pipe 119, and the exhaust gas discharge side connects to the exhaust gas inlet pipe 116 of the exhaust gas purification device 100. As shown in FIG. 11, FIG. 12, and FIG. 16, the exhaust connecting member 120 is detachably attached to the front portion of the left side surface of the support pedestal 121 by a pair of upper and lower bolts 122, 122.

Figure 15:
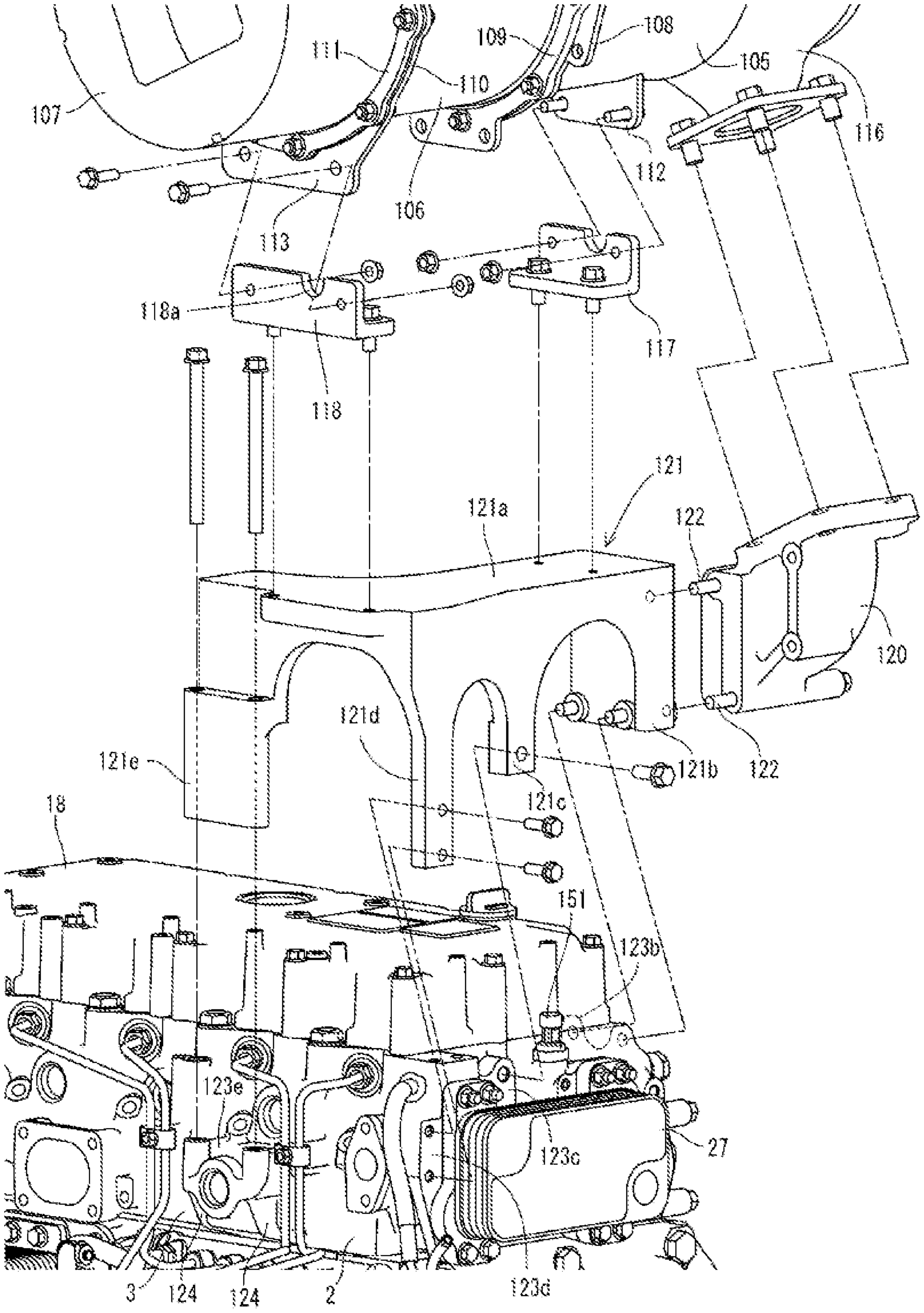
FIG. 15 is a schematic exploded perspective view for explaining an attachment structure of the same support pedestal and the exhaust gas purification device.

As shown in FIG. 11 and FIG. 15, the exhaust gas purification device 100 is attached to the front portion of the cylinder head 2 through the left and right support brackets 117, 118 and the support pedestal 121. The exhaust gas purification device 100 has a left bracket fastening leg 112 which is welded and fixed to a lower portion of the outer circumferential surface of the upstream case 105, and a right bracket fastening leg 113 which is provided at a lower portion of the sandwiching flange 110.

The left and right support brackets 117, 118 each has a substantially L-shape with a horizontal portion and a rising portion protruding upward from the left or right outer side end of the horizontal portion. The horizontal portion of the left support bracket 117 is fixed by a pair of front and rear bolts to an upper surface portion of a flat portion 121*a* of the support pedestal 121 close to the left side. The horizontal portion of the right support bracket 118 is fixed by a pair of front and rear bolts to an upper surface right edge portion of the flat portion 121*a* of the support pedestal 121. The right and left bracket fastening legs 112, 113 of the exhaust gas purification device 100 are attached to the left and right support brackets 117, 118, each with a pair of front and rear bolts and nuts.

On the upper surface of the rising portion of the right support bracket 118, there is a cut-out portion 118*a* that enables temporarily placing a head portion of the bolt fastening the lower portions of the sandwiching flanges 110, 111. When the exhaust gas purification device 100 is to be assembled with the engine 1, the head portion of the bolt fastening the lower portion of the sandwiching flanges 110, 111 is positioned to the cut-out portion 118*a* of the right support bracket 118, while the left and right support brackets 117, 118 and the exhaust connecting member 120 are attached to the support pedestal 121. This way, the exhaust gas purification device 100 can be positioned with respect to the engine device 1, and fastening bolts at a time of assembling the exhaust gas purification device 100 with the engine 1 becomes easy. Therefore, the workability for assembling is improved.

As shown in FIG. 11 to FIG. 16, the flat portion 121*a* of the support pedestal 121 has a substantially L-shape in a plan view, with its right portion being longer than its left portion. The flat portion 121*a* is arranged so as to cover the front portion of the cylinder head 2 along the front side surface and the right side surface of the cylinder head 2 in a plan view. On this flat portion 121*a*, the exhaust gas purification device 100 is mounted.

Further, the support pedestal 121 has a plurality of legs 121*b*, 121*c*, 121*d*, 121*e* which protrude downward from the flat portion 121*a* and are fixed to the cylinder head 2. Portions between the legs 121*b*, 121*c*, 121*d*, 121*e* are formed in an arch-shape which is convex upward. The cylinder head 2 includes: an exhaust side attaching part 123*b* provided in a front portion of the left side surface; a first center attaching part 123*c* provided in a middle portion of the front side surface, close to the top; a second center attaching part 123*d* provided in a right edge portion of the front side surface; and an air-intake side attaching part 123*e* provided in a front end portion of the upper surface of the air-intake manifold 3 which is integrally formed on the right side surface.

A lower end portion of the exhaust side leg 121*b* is fixed to the exhaust side attaching part 123*b* with a pair of front and rear bolts. A lower end portion of the first center leg 121*c* is fixed to the first center attaching part 123*c* with a single bolt. A lower portion of the second center leg 121*d* is fixed to the second center attaching part 123*d* with a pair of upper and lower bolts. The air-intake side leg 121*e* has a pair of front and rear bolt insertion holes bored in an up-down direction, and is attached to the air-intake side attaching part 123*e* by a pair of front and rear bolts inserted into the bolt insertion holes.

As shown in FIG. 11, FIG. 13 to FIG. 15, and FIG. 21, the air-intake manifold 3 is formed integrally with the right side surface of the cylinder head 2. The air-intake side leg 121*e* is fixed to the air-intake side attaching part 123*e* provided to air-intake manifold 3. Therefore, the air-intake side leg 121*e* can be placed on and firmly fixed to the robust air-intake manifold 3. Further, the work of tightening or loosening the pair of front and rear bolts for fixing the air-intake side leg 121*e* to the air-intake manifold 3 can be performed from the upper side of the cylinder head 2. Therefore, for example, work for attaching and removing the support pedestal 121 can be performed while the EGR device 24 (see FIG. 5 and the like) arranged on the right lateral side of the cylinder head 2 is attached to the air-intake manifold 3. Therefore, the workability for assembling and maintenance of the engine 1 can be improved.

Figure 13:
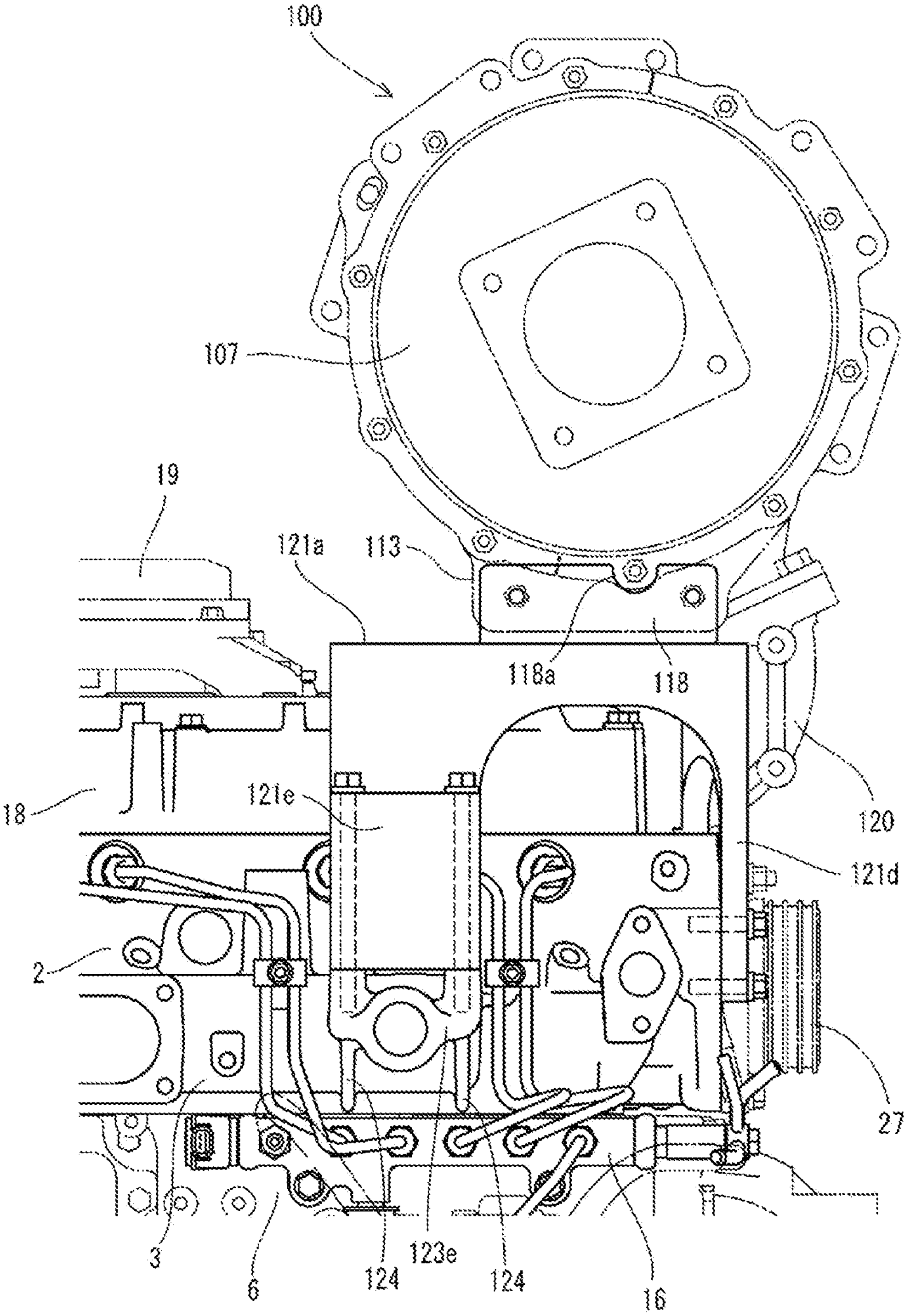
FIG. 13 is a schematic right side view enlarging and showing the surroundings of the same support pedestal.
Figure 14:
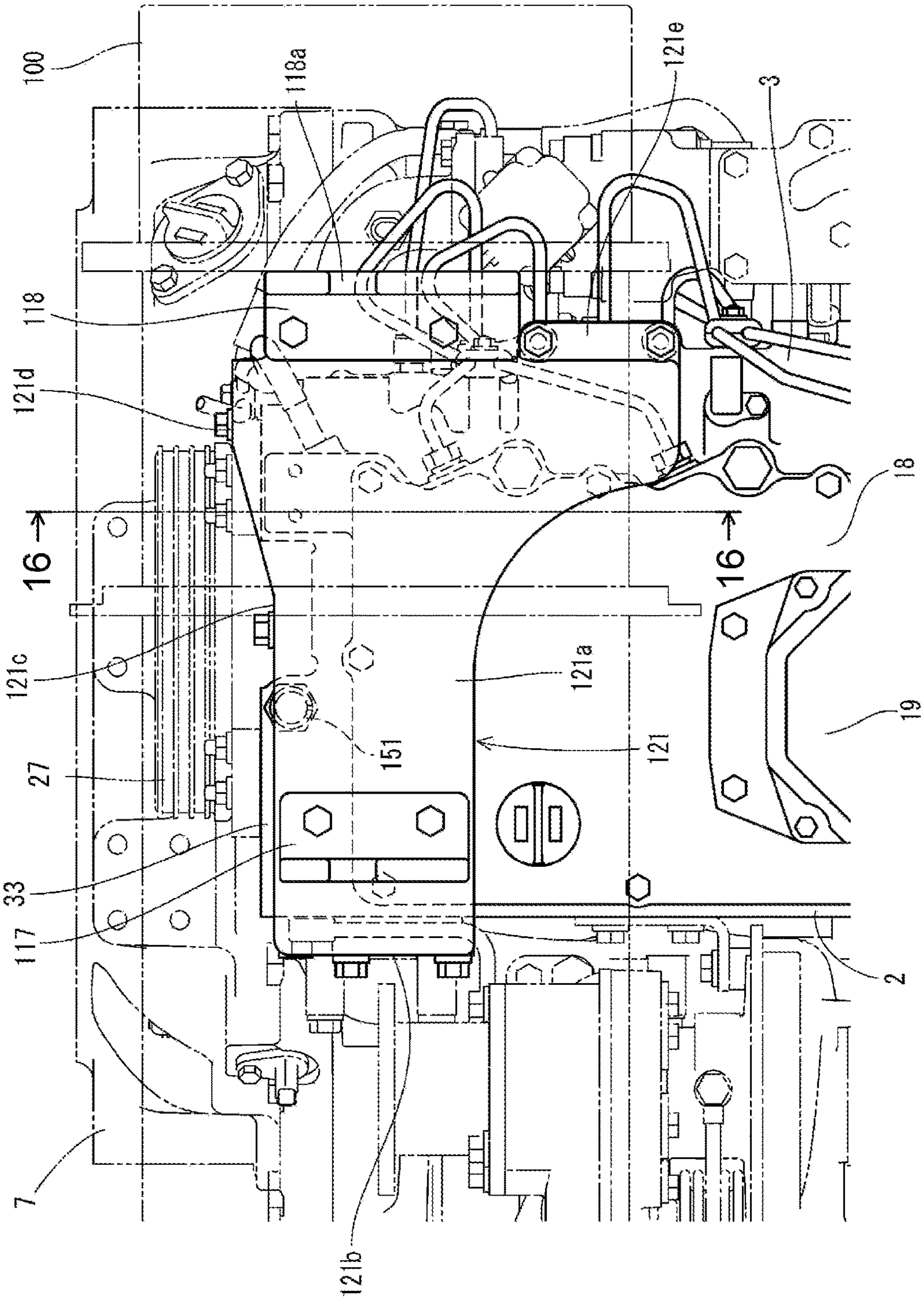
FIG. 14 is a schematic plan view enlarging and showing the surroundings of the same support pedestal.

As shown in FIG. 11, FIG. 13, and FIG. 15, a pair of front and rear reinforcing ribs 124, 124 are formed as protrusions, on the right side surface and the lower surface of the air-intake manifold 3, below the air-intake side attaching part 123*e*. The reinforcing ribs 124, 124 extend in the up-down direction, and can improve the strength of the air-intake manifold 3 around the air-intake side attaching part 123*e*. This way, deformation of the air-intake manifold 3 and the cylinder head 2 due to attaching of the support pedestal 121 to the air-intake manifold 3 can be suppressed or reduced.

As shown in FIG. 11 to FIG. 16, the support pedestal 121 has the flat portion 121*a* and the legs 121*b*, 121*c*, 121*d*, 121*e* which are integrally formed. The portions between the legs 121*b*, 121*c*, 121*d*, 121*e* are formed in an arch-shape. With this, the support pedestal 121 can be lightened, while maintaining its rigidity. Further, by making the support pedestal 121 an integrally molded part, the number of parts can be reduced. Further, the arch-shaped gaps between the legs 121*b*, 121*c*, 121*d*, 121*e* can suppress or reduce heat accumulation around the legs 121*b*, 121*c*, 121*d*, 121*e*. This way, for example, thermal damage to electronic components mounted around the legs of a later-described exhaust pressure sensor 151 and the like and an insufficient cooling of cooling parts such as the EGR cooler 27 can be suppressed or reduced.

The support pedestal 121 includes: the exhaust side leg 121*b* fixed to the left side surface of the cylinder head 2; the air-intake side leg 121*e* fixed to the right side surface of the cylinder head 2; and the center legs 121*c*, 121*d* fixed to the front side surface of the cylinder head 2. Therefore, the support pedestal 121 can be fixed to three surfaces of the cylinder head 2, i.e., the right side surface, the left side surface, and the front side surface. Therefore, the support rigidity of the exhaust gas purification device 100 can be improved.

As shown in FIG. 11, FIG. 13, and FIG. 15, the heights and sizes (widths) of the arch-shape between the air-intake side leg 121*e* and the second center leg 121*d*, the arch-shape between the center legs 121*c*, 121*d*, and the arch-shape between the exhaust side leg 121*b* and the first center leg 121*c* are different from one another. The exhaust side leg 121*b* and the air-intake side leg 121*e* have are different from each other in lengths relative to the up-down direction. By suitably designing these arch-shapes and the length of the legs, vibration in the air-intake side and the exhaust gas side can be cancelled by the support pedestal 121, and therefore the vibration of the exhaust gas purification device 100 can be reduced.

As shown in FIG. 11 and FIG. 16, the flat portion 121*a* and the legs 121*b*, 121*c*, 121*d*, 121*e* of the support pedestal 121 are spaced from the cylinder head cover 18. Therefore, a cooling air passage 148, in which cooling air 149 flows from the cooling fan 9 (see FIG. 3) arranged in the rear of the engine 1, is formed between the support pedestal 121 and the cylinder head cover 18. Therefore, the cooling air 149 from the cooling fan 9 can be guided to the front side surface side of the cylinder head 2 through the cooling air passage 148, and the surroundings of the front side surface of the cylinder head 2 can be suitably cooled. In this embodiment, the EGR cooler 27 and the later-described exhaust pressure sensor 151 are attached to the front side surface of the cylinder head 2. Therefore, the cooling air 149 from the cooling fan 9 leading to the front side surface of the cylinder head 2 through the cooling air passage 148 can facilitate cooling of the EGR cooler 27 and achieve suppression and reduction of thermal damages to the exhaust pressure sensor 151.

Figure 19:
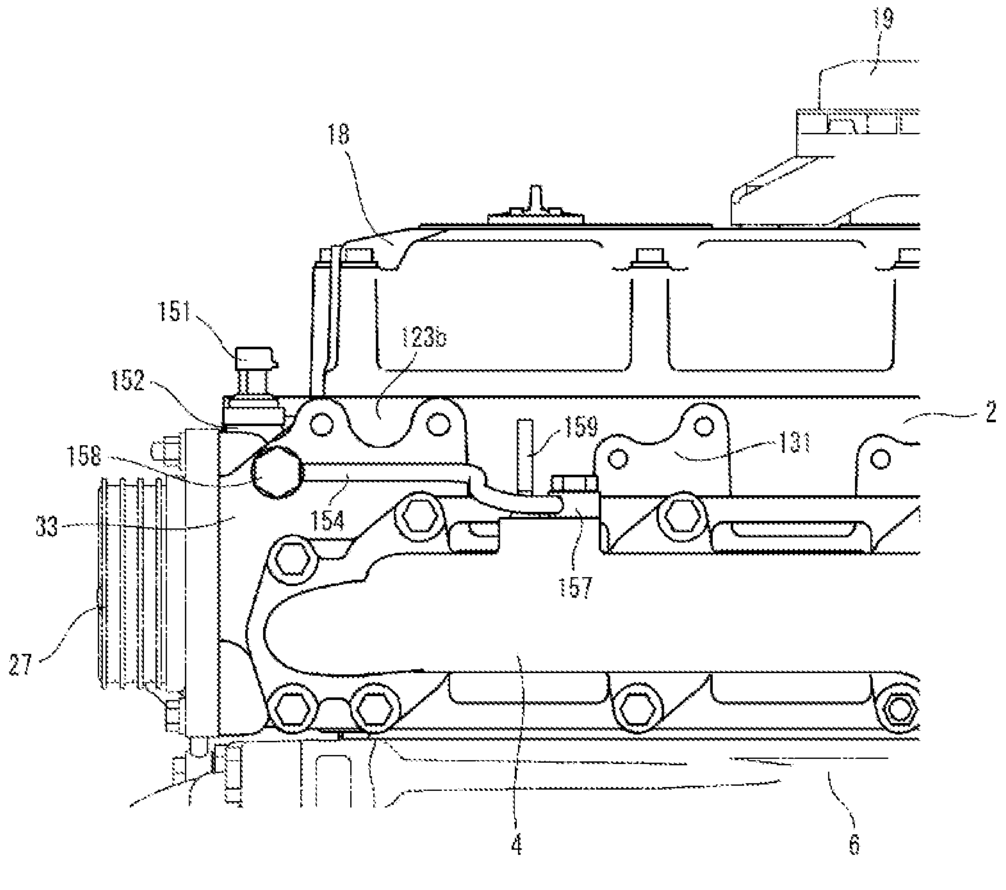
FIG. 19 is a schematic left side view enlarging and showing the surroundings of the front portion of the same cylinder head.
Figure 20:
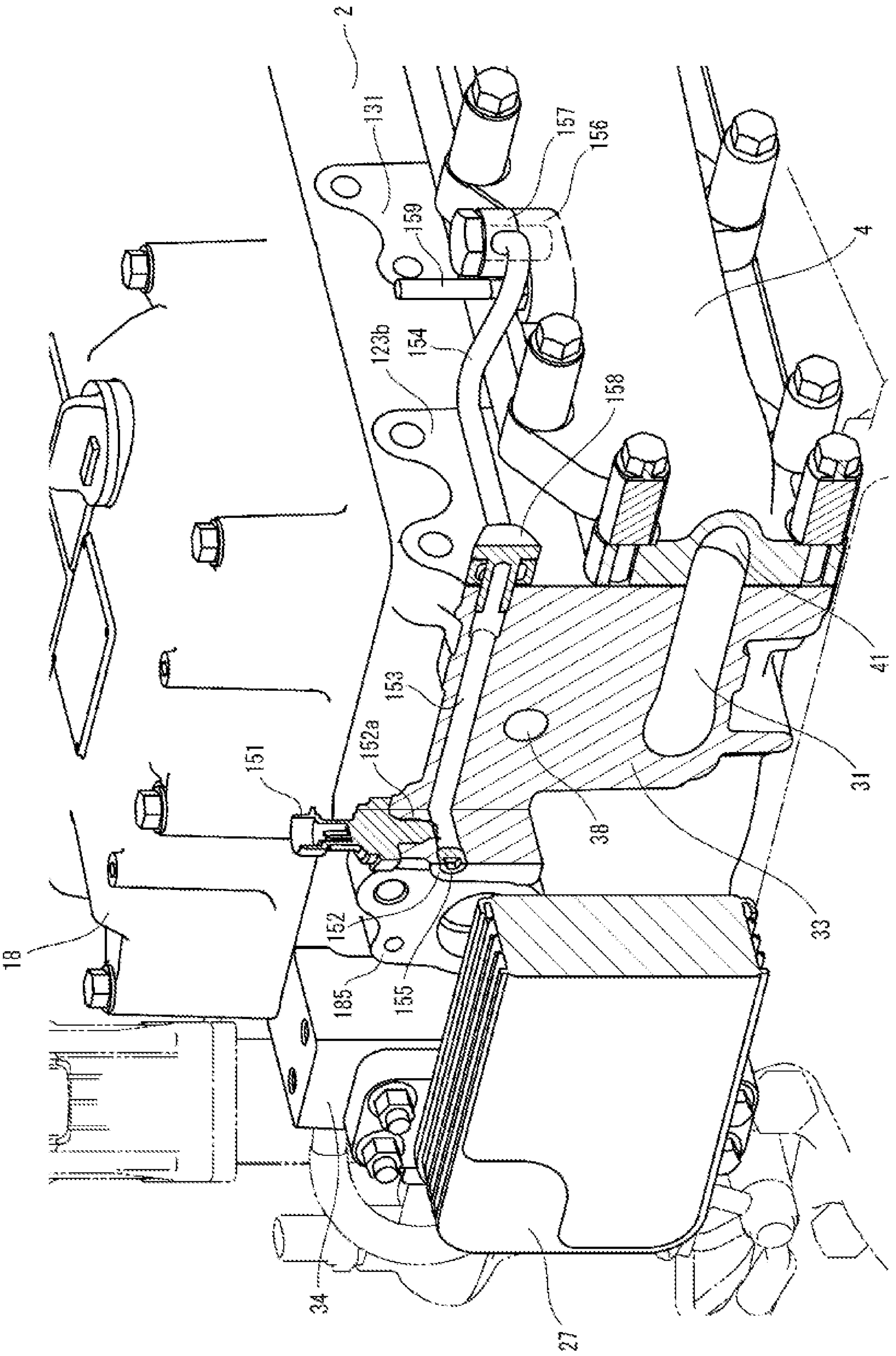
FIG. 20 is a schematic perspective view of the front portion of the same cylinder head and an EGR cooler, which are partially cut away.
Figure 21:
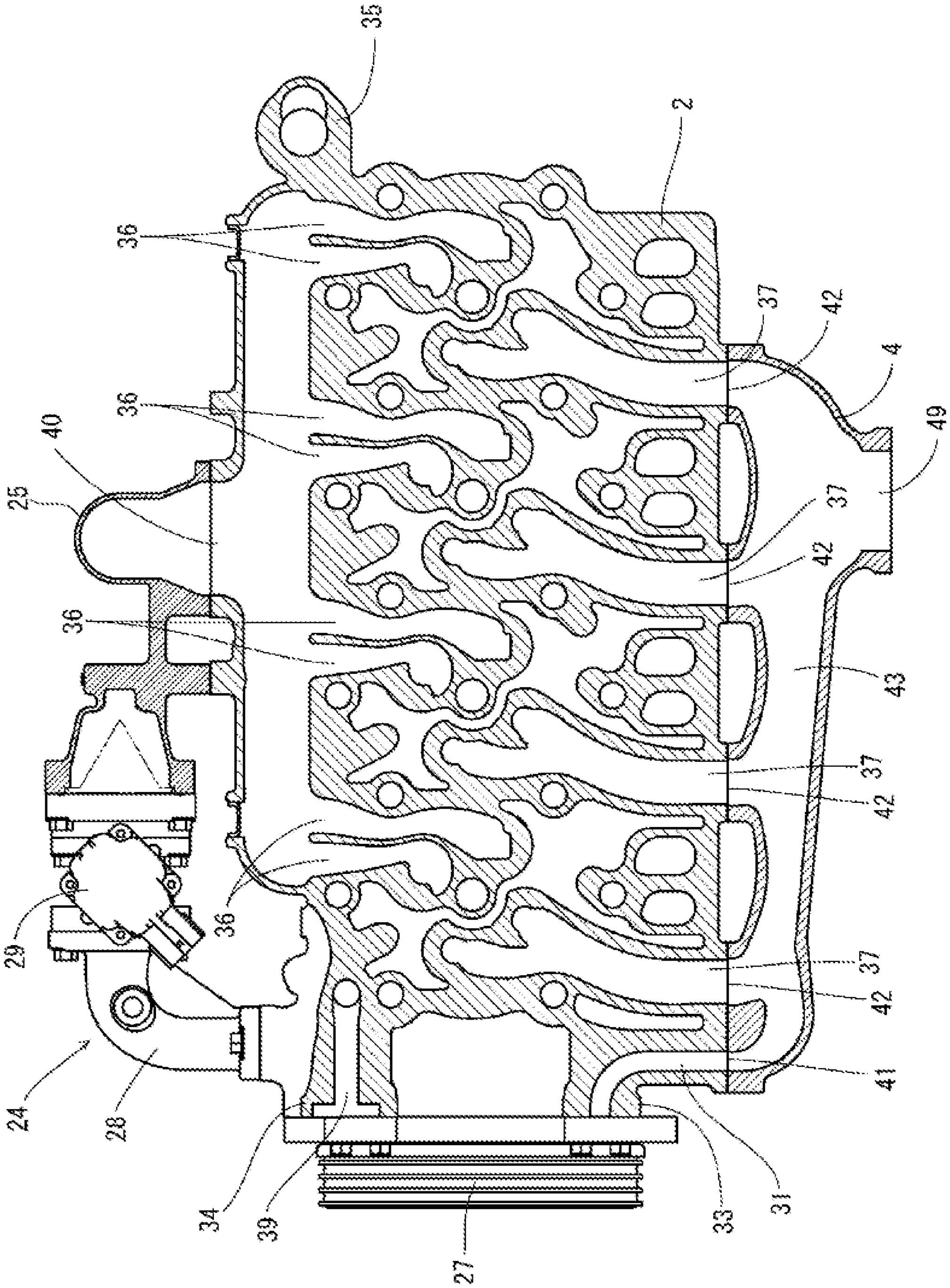
FIG. 21 is a schematic cross-sectional plan view showing the structures of an exhaust gas passage and an air-intake passage in the cylinder head.

Next, the following describes a structure around the front side surface of the cylinder head 2 with reference to FIG. 17 to FIG. 21 and the like. As shown in FIG. 21, the cylinder head 2 is provided with a plurality of air-intake passages 36 for taking fresh air into a plurality of air-intake ports (not shown) and a plurality of exhaust gas passages 37 for emitting an exhaust gas from a plurality of exhaust gas ports. The intake manifold 3 which aggregates the plurality of intake fluid passages 36 is formed integrally with a right side portion of the cylinder head 2. Since the cylinder head 2 is integrated with the intake manifold 3, a gas sealability between the intake manifold 3 and the intake fluid passages 36 can be enhanced, and in addition, the rigidity of the cylinder head 2 can be increased.

On the right side surface of the exhaust manifold 4, which is coupled to the left side surface of the cylinder head 2, an EGR gas outlet 41 communicating with the upstream EGR gas passage 31 in the cylinder head 2 and an exhaust gas inlet 42 communicating with the plurality of exhaust gas passages 37 are arranged in the front-rear direction, and are opened. In the exhaust manifold 4, an exhaust aggregate part 43 communicating with the EGR gas outlet 41 and the exhaust gas inlet 42 is formed. In a rear portion of the left side surface of the exhaust manifold 4, an exhaust manifold exhaust gas outlet 49 communicating with the exhaust aggregate part 43 is opened. After the exhaust gas coming from the exhaust gas passage 37 of the cylinder head 2 flows into the exhaust aggregate part 43 through the exhaust gas inlets 42, part of the exhaust gas serves as an EGR gas and flows into the upstream EGR gas passage 31 of the cylinder head 2 through the EGR gas outlet 41 while the rest of the exhaust gas flows into the two-stage turbocharger 30 (see FIG. 7 and the like) via the exhaust manifold exhaust gas outlet 49.

In the cylinder head 2, the exhaust manifold 4 is coupled to the left side surface (exhaust side surface) which is opposite to the right side surface (air-intake side surface) where the air-intake manifold 3 is integrally formed, and the EGR cooler 27 is coupled to the front side surface (first side surface of out of two side surfaces intersecting the exhaust side surface). The left and right EGR cooler coupling portions 33, 34 are provided at the left and right edge portions of the front side surface of the cylinder head 2 (left and right front corner portions of the cylinder head 2) so as to protrude forward. The EGR cooler 27 is coupled to the front side surfaces of the left and right EGR cooler coupling portions 33, 34. In the EGR cooler coupling portions 33, 34, the EGR gas passages 31, 32 and the cooling water passages 38, 39 are formed.

Since the EGR gas passages 31, 32 and the cooling water passages 38, 39 are provided in the EGR cooler coupling portions 33, 34, there is no need for arranging that cooling water piping and EGR gas piping between the EGR cooler 27 and the cylinder head 2. This can give a sealability to a coupling portion coupled to the EGR cooler 27 without any influence of, for example, extension and contraction of piping caused by the EGR gas or the cooling water. This can also enhance a resistance (structural stability) against external fluctuation factors such as heat and vibration, and moreover can make the configuration compact.

Figure 17:
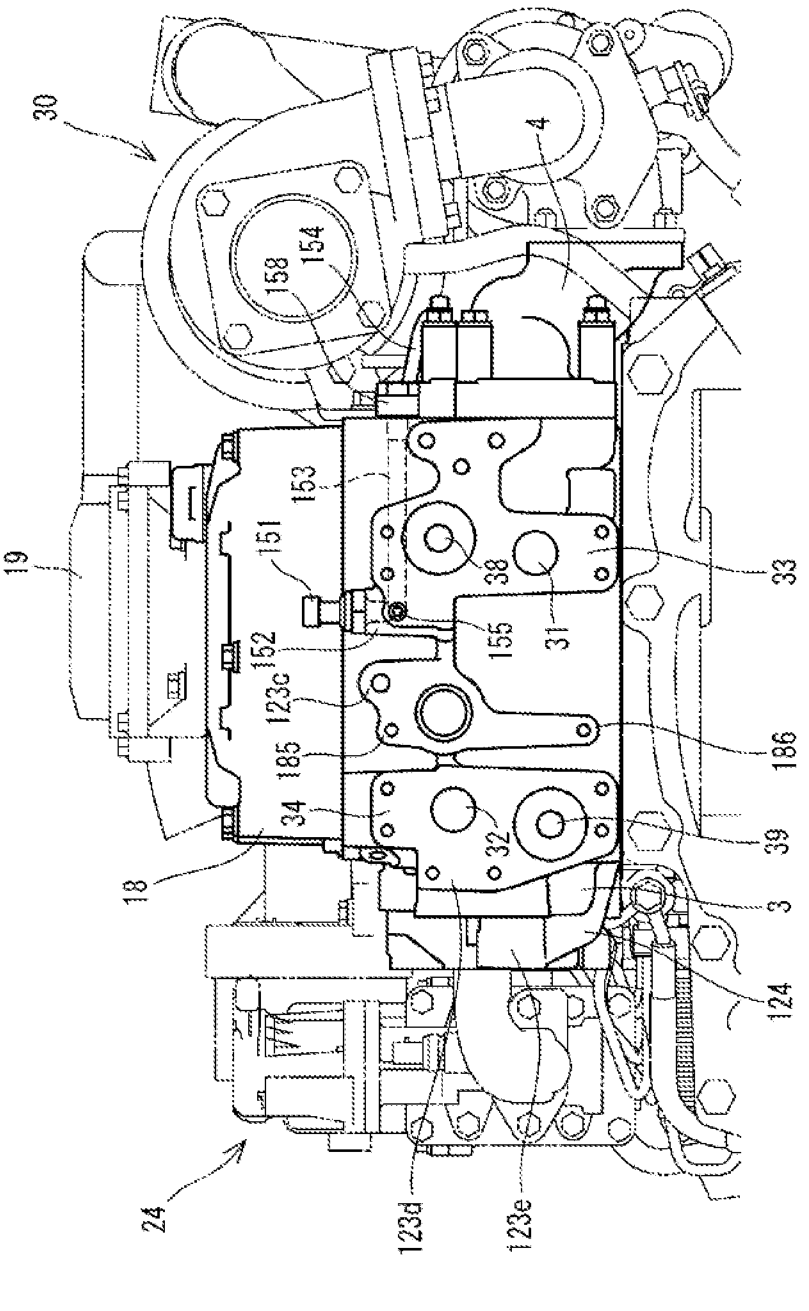
FIG. 17 is a schematic front view enlarging and showing the surroundings of a cylinder head.

As shown in FIG. 17, FIG. 20, and FIG. 21, the upstream EGR gas passage 31 is provided in the left EGR cooler coupling portion 33, and the downstream EGR gas passage 32 is provided in the right EGR cooler coupling portion 34. The upstream EGR gas passage 31 has a substantially L-shape in a plan view with one end and the other end open in the front side surface and the left side surface of the left EGR cooler coupling portion 33, and connects a lower left portion of the back side of the EGR cooler 27 with the EGR gas outlet 41 provided in a portion of the right side surface of the exhaust manifold 4 close to the front. The downstream EGR gas passage 32 has a substantially L-shape in a plan view with one end and the other end open in the front side surface and the right side surface of the right EGR cooler coupling portion 34, and connects an upper right portion of the back side of the EGR cooler 27 with the EGR gas inlet of the recirculation exhaust gas pipe 28.

In the left EGR cooler coupling portion 33, a downstream cooling water passage 38 is formed to lead to the rear side from the front side surface of the left EGR cooler coupling portion 33. The downstream cooling water passage 38 is provided on the upper side of the upstream EGR gas passage 31 and feeds cooling water discharged from an upper left portion of the back surface of the EGR cooler 27 to the cooling water passage in the cylinder head 2. In the right EGR cooler coupling portion 34, an upstream cooling water passage 39 is formed to lead to the rear side from the front side surface of the right EGR cooler coupling portion 34. The upstream cooling water passage 39 is provided on the lower side of the downstream EGR gas passage 32 and feeds cooling water flowing in the cooling water passage in the cylinder head 2 to a lower right portion of the back surface of the EGR cooler 27.

As shown in FIG. 17 to FIG. 20, an exhaust pressure sensor 151 configured to detect an exhaust gas pressure in the exhaust manifold 4 is provided on the front side surface of the cylinder head 2. The exhaust pressure sensor 151 is attached to an exhaust pressure sensor attaching part 152 which protrudes forward at a portion close to upper middle portion of the front side surface of the cylinder head 2. The exhaust pressure sensor attaching part 152 is provided between the left and right EGR cooler coupling portions 33, 34. In the engine 1 of this embodiment, a left edge portion of the exhaust pressure sensor attaching part 152 is continuous to an upper right edge portion of the left EGR cooler coupling portion 33.

The exhaust pressure sensor 151 is connected to the exhaust manifold 4 through an exhaust pressure bypass path 153 provided in the cylinder head 2 and an exhaust pressure detection pipe 154 connecting the exhaust pressure bypass path 153 to the exhaust manifold 4. The exhaust pressure bypass path 153 is bored from the front end portion of the left side surface of the cylinder head 2 toward the right lateral side, and extended to the inside of the exhaust pressure sensor attaching part 152 through the inside of the left EGR cooler coupling portion 33. The exhaust pressure bypass path 153 is bent forward in the exhaust pressure sensor attaching part 152, and opened in the front side surface of the exhaust pressure sensor attaching part 152. To the front side surface of the exhaust pressure sensor attaching part 152, a hole closing member 155 for closing an end portion of the exhaust pressure bypass path 153 is attached.

Figure 18:
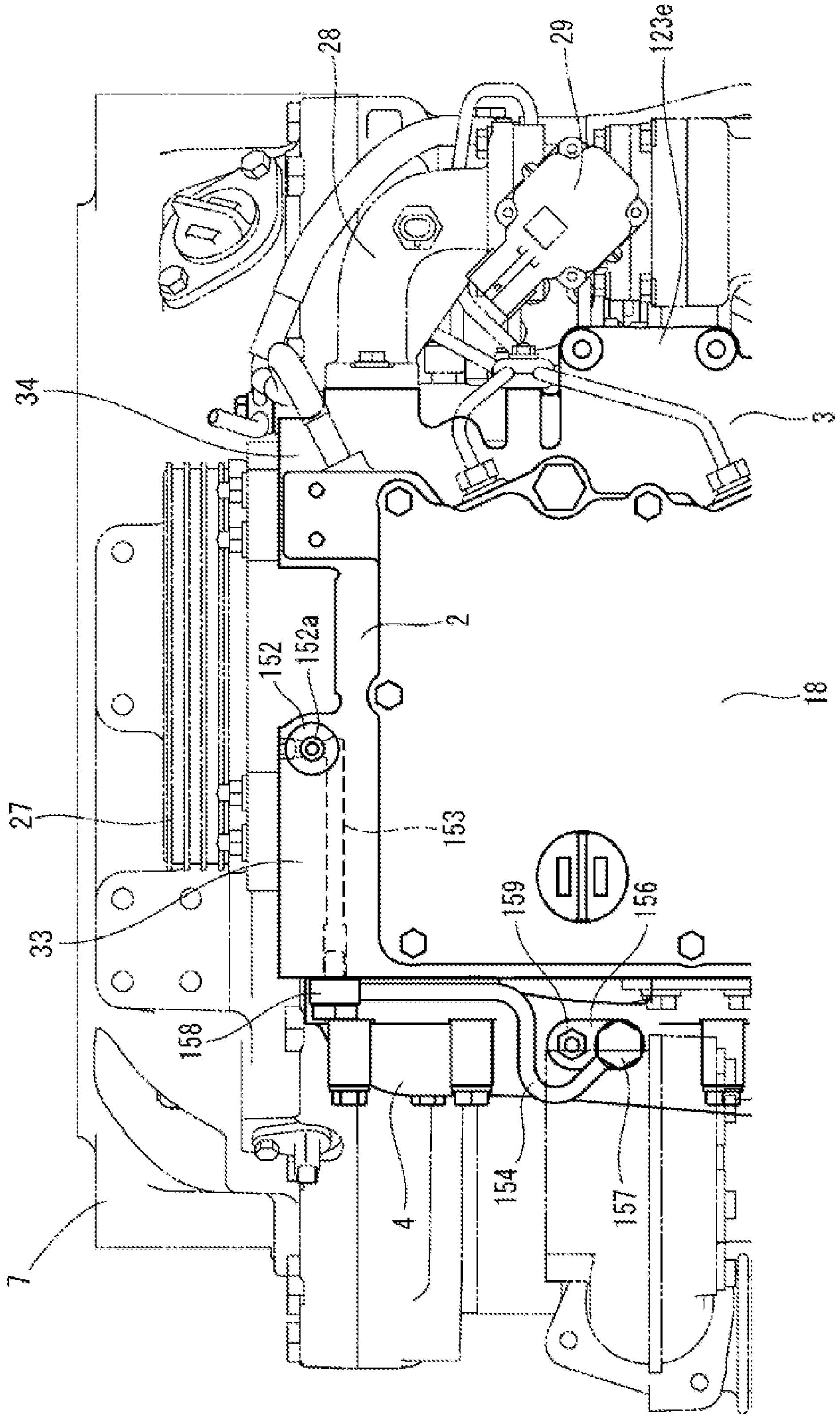
FIG. 18 is a schematic plan view enlarging and showing the surroundings of a front portion of the same cylinder head.

As shown in FIG. 18, the exhaust pressure sensor attaching part 152 includes a sensor attaching hole **152*a* which is bored downward from the upper surface of exhaust pressure sensor attaching part 152 and extended to the exhaust pressure bypass path 153. While the exhaust pressure sensor 151 is attached to the sensor attaching hole 152*a*, the lower end portion of the exhaust pressure sensor 151 is exposed to the exhaust pressure bypass path 153**.

Meanwhile, the exhaust pressure detection pipe 154 is arranged above the exhaust manifold 4, on the left lateral side of the front portion of the left side surface of the cylinder head 2. A detection pipe attaching base 156 protrudes upward at a portion of the upper surface of the exhaust manifold 4, close to the front. A rear side joint member 157 is attached to an upper surface of the detection pipe attaching base 156. Further, a front side joint member 158 is attached to an end portion of the exhaust pressure bypass path 153 opened at the front end portion of the left side surface of the cylinder head 2. A front end of the exhaust pressure detection pipe 154 is connected to the exhaust pressure bypass path 153 through the front side joint member 158. A rear end of the exhaust pressure detection pipe 154 is connected to the exhaust aggregate part 43 (see FIG. 21) in the exhaust manifold 4 through the rear side joint member 157. It should be noted that an exhaust gas temperature sensor 159 is attached to the upper surface of the detection pipe attaching base 156, at a position further forward than the rear side joint member 157. The exhaust gas temperature sensor 159 detects the temperature of the exhaust gas flowing in the exhaust aggregate part 43 in the exhaust manifold 4.

The heat transmitted from the exhaust manifold 4 with a high temperature to the exhaust pressure detection pipe 154 is spread by the cylinder head 2 through the front side joint member 158. This way, the heat from the exhaust manifold 4 and the heat from the exhaust pressure detection pipe 154 are not directly conducted to the exhaust pressure sensor 151 which is vulnerable to heat. Therefore, the length of the exhaust pressure detection pipe 154 can be shortened while avoiding failure or malfunction of the exhaust pressure sensor 151 caused by heat of the exhaust manifold 4 and the exhaust pressure detection pipe 154. Further, by shortening the length of the exhaust pressure detection pipe 154, the reliability of the exhaust pressure detection pipe 154 is improved, and the exhaust pressure detection pipe 154 is easily arranged. Therefore, the number of steps for designing can be reduced and the manufacturability and assemblability of the engine 1 can be improved.

As shown in FIG. 17 and FIG. 20, in the left EGR cooler coupling portion 33, the downstream cooling water passage 38 is provided nearby the exhaust pressure bypass path 153. With this, the gas temperature in the exhaust pressure bypass path 153 can be efficiently reduced. Therefore, the exhaust pressure bypass path 153 can be shortened while the heat transmitted from the gas in the exhaust pressure bypass path 153 to the exhaust pressure sensor 151 is kept within an acceptable range, and the exhaust pressure bypass path 153 to the cylinder head 2 can be easily formed. Further, since the exhaust pressure bypass path 153 passes through the inside of the left EGR cooler coupling portion 33 and the exhaust pressure sensor attaching part 152 protruding from the front side surface of the cylinder head 2, the gas in the exhaust pressure bypass path 153 can be efficiently cooled, and failure or malfunction of the exhaust pressure sensor 151 attributed to the heat can be suppressed or educed. Further, the exhaust pressure sensor 151 is attached to the exhaust pressure sensor attaching part 152 which protrudes from the front side surface of the cylinder head 2 between the pair of EGR cooler coupling portions 33, 34. Therefore, the exhaust pressure sensor 151 can be efficiently cooled, and failure or malfunction of the exhaust pressure sensor 151 attributed to the heat can be suppressed or reduced.

Further, as shown in FIG. 19, the attachment position of the front side joint member 158 is higher than the upper surface of the detection pipe attaching base 156. The exhaust pressure detection pipe 154 extends obliquely left forward direction from the rear side joint member 157, extends obliquely upward while being curved toward right to bypass the exhaust gas temperature sensor 159, and then extends forward in a substantially horizontal direction along the left side surface of the cylinder head 2, and connects to the front side joint member 158. The exhaust pressure detection pipe 154 has an end portion on the side of the front side joint member 158 positioned higher than an end portion on the side of the rear side joint member 157. Therefore, the oil and water in the exhaust gas can be kept from turning into liquid in the exhaust pressure detection pipe 154 and entering into the exhaust pressure bypass path 153. Therefore, the exhaust gas pressure can be accurately detected.

Since the EGR cooler coupling portions 33, 34 are configured in a protruding manner as shown in FIG. 17 to FIG. 21, there is no need for EGR gas piping that communicates the exhaust manifold 4, the EGR cooler 27, and the EGR device 24. Thus, the number of coupling portions of the EGR gas passage is small. Accordingly, in the engine 1 that aims to reduce NOx by the EGR gas, EGR gas leakage can be reduced, and moreover deformation can be suppressed which may otherwise be caused by a change in a stress due to extension and contraction of piping. Since the EGR gas passages 31, 32 and the cooling water passages 38, 39 are provided in the EGR cooler coupling portions 33, 34, the shapes of the gas passages 31, 32, 38, 39 formed in the cylinder head 2 are simplified, so that the cylinder head 2 can be easily formed by casting without using a complicated core.

Further, the left EGR cooler coupling portion 33 on the exhaust manifold 4 side and the right EGR cooler coupling portion 34 on the air-intake manifold 3 side are distant from each other. This can suppress a mutual influence between thermal deformations of the EGR cooler coupling portions 33, 34. Accordingly, gas leakage, cooling water leakage, and damages and the like of coupling portions where the EGR cooler coupling portions 33, 34 are coupled to the EGR cooler 27 can be suppressed or reduced, and in addition, a balance of the rigidity of the cylinder head 2 can be maintained. Further, since the volume at the front side surface of the cylinder head 2 can be reduced, weight reduction of the cylinder head 2 can be achieved. Further, since the EGR cooler 27 can be arranged at a distance from the front side surface of the cylinder head 2, creating a space on the front and rear sides of the EGR cooler 27, cool air can flow around the EGR cooler 27, and hence the cooling efficiency of the EGR cooler 27 can be increased.

As shown in FIG. 17, in the left EGR cooler coupling portion 33, the downstream cooling water passage 38 is arranged above the upstream EGR gas passage 31. In the right EGR cooler coupling portion 34, the downstream EGR gas passage 32 is arranged above the upstream cooling water passage 39. A cooling water inlet of the downstream cooling water passage 38 and an EGR gas inlet of the downstream EGR gas passage 32 are arranged at the same height. A cooling water outlet of the upstream cooling water passage 39 and the EGR gas outlet of the downstream EGR gas passage 32 are arranged at the same height.

Since the EGR gas passages 31, 32 and the cooling water passages 38, 39 are provided in the EGR cooler coupling portions 33, 34 protruding at a distance from each other, a mutual influence between thermal deformations of the EGR cooler coupling portion 33, 34 is relieved. In the EGR cooler coupling portions 33, 34, the EGR gas flowing in the EGR gas passages 31, 32 is cooled by the cooling water flowing in the cooling water passages 38, 39, so that thermal deformations of the EGR cooler coupling portions 33, 34 are suppressed. In addition, the up-down positional relationship of the EGR gas passages 31, 32 and the cooling water passages 38, 39 in one of the EGR cooler coupling portions 33, 34 is reverse to that in the other of the EGR cooler coupling portions 33, 34. As a result, heat distributions in the respective EGR cooler coupling portions 33, 34 are in opposite directions with respect to the up-down direction, which can reduce an influence of thermal deformation in the height direction in the cylinder head 2.

Next, a part of a harness structure arranged around the front side surface of the cylinder head 2 is described with reference to FIG. 22, FIG. 23, and the like. In the engine 1 of this embodiment, a harness assembly 171 connecting a plurality of harnesses is arranged in the front-rear direction along the right side surface of the cylinder head cover 18. The harness assembly 171 is branched from a main harness assembly (not shown) extending from an external connection harness connector (not shown) attached to the engine 1.

A front end portion of the harness assembly 171 is arranged between the cylinder head cover 18 and the air-intake side leg 121*e* of the support pedestal 121. The harness collection member 171 is branched into an EGR valve harness 172, an EGR gas temperature sensor harness 173, and a sensor harness assembly 174 nearby the right front corner portion of the cylinder head cover 18. The EGR valve harness 172 passes between the second center leg 121*d* and the air-intake side leg 121*e* of the support pedestal 121, and is electrically connected to the EGR valve member 29. The EGR gas temperature sensor harness 173 passes between the second center leg 121*d* and the air-intake side leg 121*e*, and is electrically connected to the EGR gas temperature sensor 181 configured to detect the exhaust gas temperature in the recirculation exhaust gas pipe 28.

The sensor harness assembly 174 extends toward the left lateral side from the harness assembly 171, and is bent downward at the front of a portion close to the right of the front side surface of the cylinder head cover 18. A front end portion of the sensor harness assembly 174 is branched into a rotation angle sensor harness assembly 175 and an exhaust pressure sensor harness 176. The exhaust pressure sensor harness 176 extends from the harness assembly 174 toward the left lateral side, passes between the cylinder head cover 18 and the first center leg 121*c* of the support pedestal 121, and is electrically connected to the exhaust pressure sensor 151.

The rotation angle sensor harness set member 175 extends downward along the front side surface of the cylinder head 2, from the sensor harness assembly 174. Further, the rotation angle sensor harness assembly 175 is bent to the left lateral side at a position immediately above the flywheel housing 7, so as to extend toward the front of the lower left corner portion of the front side surface of the cylinder head 2. The rotation angle sensor harness assembly 175 is branched into a crankshaft rotation angle sensor harness 177 and a camshaft rotation angle sensor harness 178. The crankshaft rotation angle sensor harness 177 is electrically connected to a crankshaft rotation angle sensor 182 (see FIG. 1) attached to an upper left portion of the front portion of the flywheel housing 7. The camshaft rotation angle sensor harness 178 is electrically connected to a camshaft rotation angle sensor 183 (see FIG. 1) attached to the upper left edge portion of the flywheel housing 7.

As shown in FIG. 17, a middle portion relative to the left-right direction of the front side surface of the cylinder head 2, locking member attaching parts 185, 186 are arranged and aligned in the up-down direction. An upper locking member attaching part 185 is arranged in a position between the right EGR cooler coupling portion 34 and the first center attaching part 123*c*, in an upper portion of the front side surface of the cylinder head 2. A lower locking member attaching part 186 is arranged in a position between the left and right EGR cooler coupling portions 33, 34, in a lower portion of the front side surface of the cylinder head 2, and is arranged immediately below the upper locking member attaching part 185.

Figure 22:
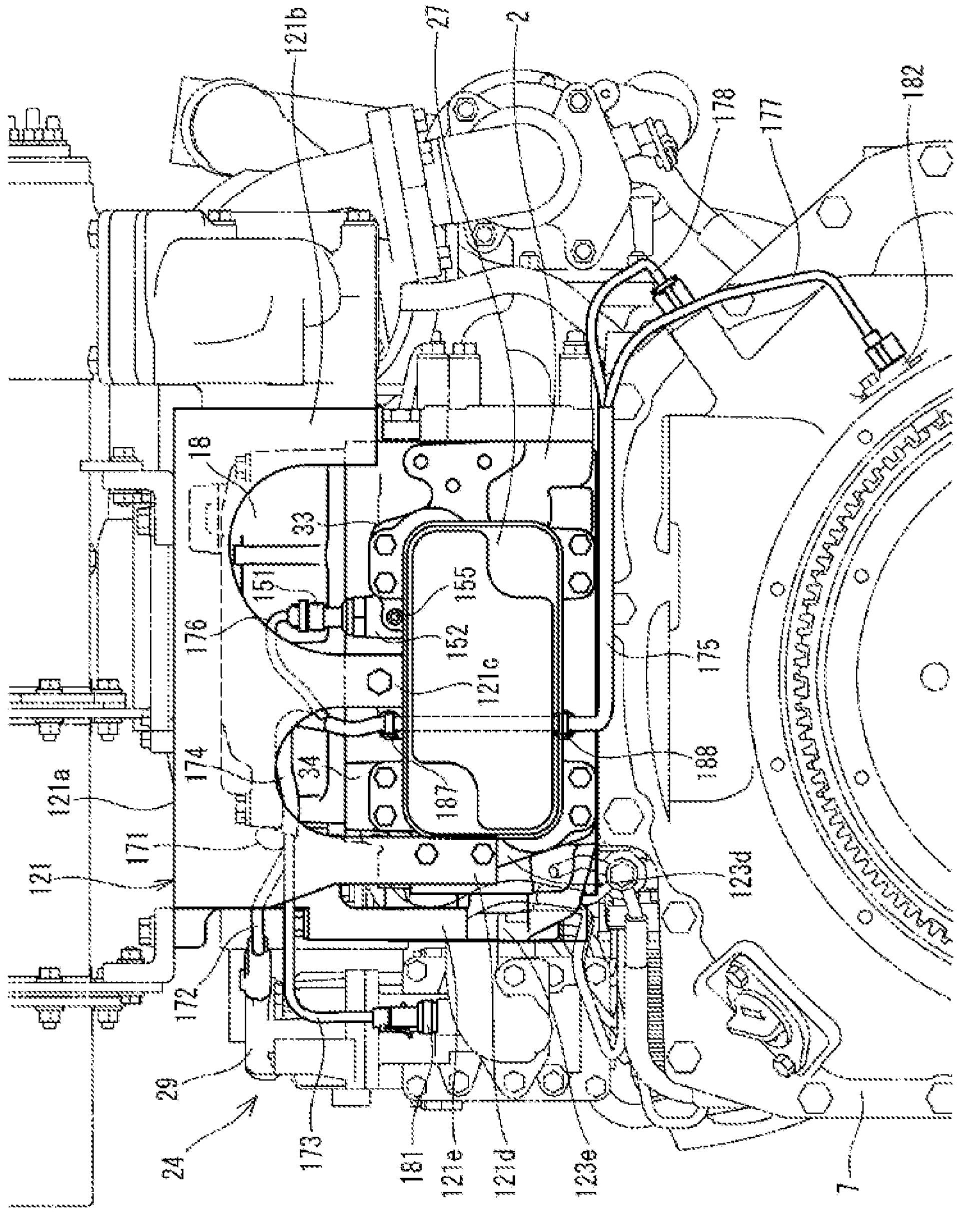
FIG. 22 is a schematic front view showing an arrangement of a wire harnesses around the front portion of the cylinder head.
Figure 23:
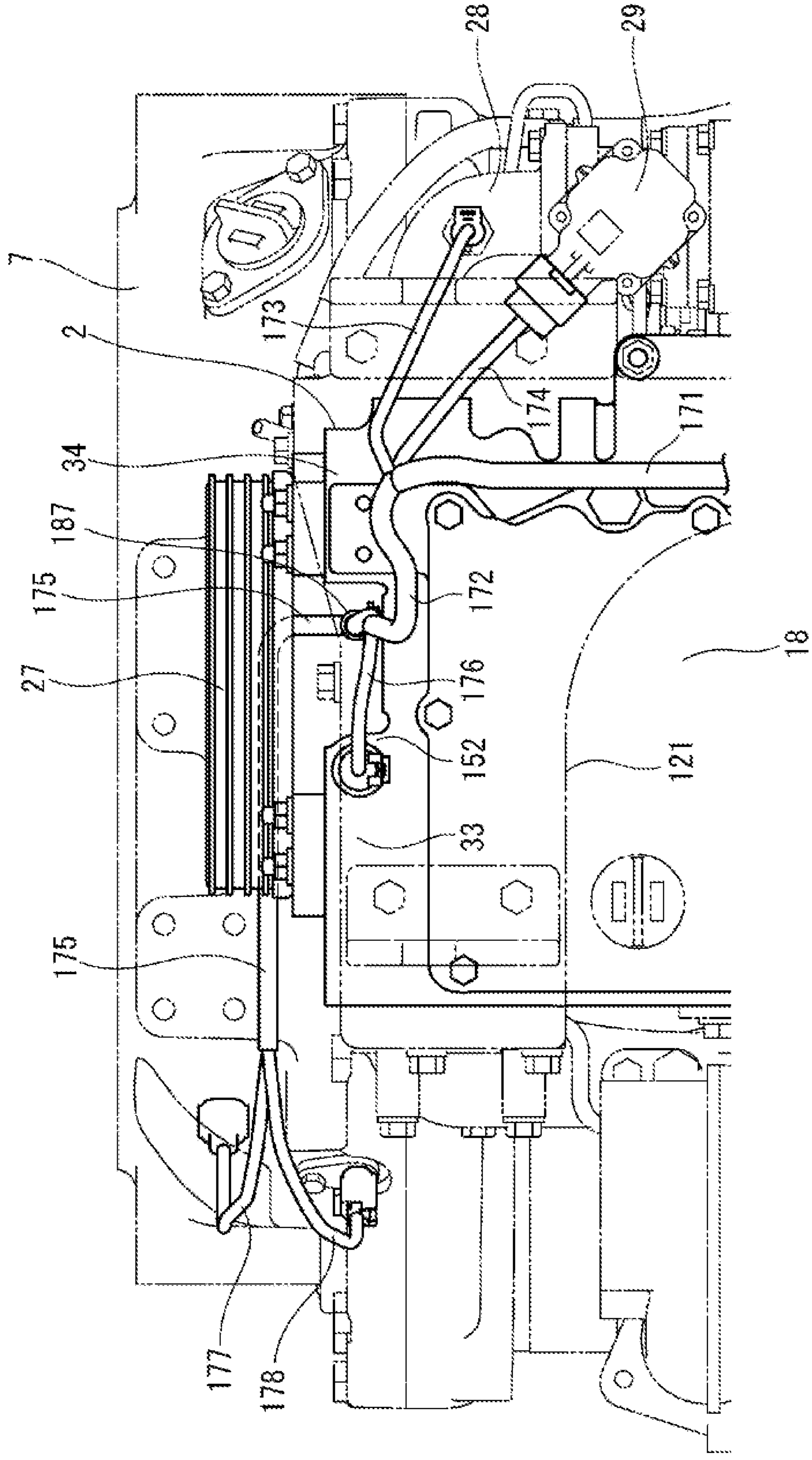
FIG. 23 is a schematic plan view showing an arrangement of a wire harnesses around the front portion of the cylinder head.

As shown in FIG. 22 and FIG. 23, a part of the rotation angle sensor harness assembly 175 facing the cylinder head 2 is attached to the front side surface of the cylinder head 2 by locking members 187, 188 attached to the locking member attaching parts 185, 186. The rotation angle sensor harness assembly 175 extends from the harness assembly 174 and passes between the right EGR cooler coupling portion 34 and the first center leg 121*c* of the support pedestal 121 and between the cylinder head 2 and the EGR cooler 27, toward the lower edge portion of the front side surface of the cylinder head 2.

The EGR cooler 27 is attached to the pair of left and right EGR cooler coupling portions 33, 34 protruding forward from the front side surface of the cylinder head 2. Between the back surface of the EGR cooler 27 and the cylinder head 2, a space is formed. In this space, the rotation angle sensor harness assembly 175 is arranged in the up-down direction. This can protect the rotation angle sensor harness assembly 175, and make it easier to design a layout of the rotation angle sensor harness assembly 175.

Furthermore, a space is formed between a side surface of the cylinder head cover 18 and the support pedestal 121. In this space, the harness assembly 171, 174 and harnesses 172, 173, 176 are arranged. This can protect the harnesses and the harness assembly, and make it easy to design a layout of the harnesses becomes easy.

As shown in FIG. 1 to FIG. 10, an engine 1 includes an exhaust manifold 4 provided on an exhaust side surface which is a first side surface (e.g., a left side surface) of a cylinder head 2 and a two-stage turbocharger 30 that is driven by exhaust gas discharged from the exhaust manifold 4. The two-stage turbocharger 30 includes a high-pressure turbocharger 51 coupled to the exhaust manifold 4, and a low-pressure turbocharger 52 coupled to the high-pressure turbocharger 51. The high-pressure turbocharger 51 is arranged on a lateral side of the exhaust manifold 4, and the low-pressure turbocharger 52 is arranged above the exhaust manifold 4. Therefore, the exhaust manifold 4 and the two-stage turbocharger 30 can be compactly arranged in a substantially quadrangular frame, and downsizing of the engine 1 can be achieved. Further, since the high-pressure exhaust gas outlet 58 of the high-pressure turbocharger 51 and the low-pressure exhaust gas inlet 60 of the low-pressure turbocharger 52 are coupled through a high-pressure exhaust gas pipe 59 which is an example of a flexible pipe, the risk of low cycle fatigue breakdown of the high-pressure exhaust gas pipe 59 due to thermal expansion can be reduced.

In the engine 1, since the low-pressure turbocharger 52 is fixed to the exhaust side surface of the cylinder head 2 and the high-pressure turbocharger 51 is fixed to the exhaust manifold 4, the high-pressure turbocharger 51 and the low-pressure turbocharger 52 constituting the two-stage turbocharger 30 can be distributed to and firmly fixed to the robust cylinder head 2 and the exhaust manifold 4. Further, since the high-pressure exhaust gas outlet 58 of the high-pressure turbocharger 51 and the low-pressure exhaust gas inlet 60 of the low-pressure turbocharger 52 are coupled through a flexible high-pressure exhaust gas pipe 59, a stress to the two-stage turbocharger 30, attributed to thermal expansion of the high-pressure exhaust gas pipe 59, can be reduced. As a result, a stress applied to a coupling portion of the high-pressure turbocharger 51 and the exhaust manifold 4, and a stress applied to a coupling portion of the low-pressure turbocharger 52 and the cylinder head 2 can be reduced, and coupling failure at these coupling portions and damages to coupling members can be suppressed or reduced.

The cylinder head 2 has therein a rib 135 extended from a low-pressure turbocharger attaching part 131 on the exhaust side surface toward an air-intake side surface (e.g., right side surface) facing the exhaust side surface. With this structure, the rigidity of the cylinder head nearby the low-pressure turbocharger attaching part 131 can be improved in the cylinder head 2, and deformation and the like of the cylinder head 2 which is caused by attaching the low-pressure turbocharger 52 to the cylinder head 2 can be suppressed or reduced.

Further, the engine 1 includes an exhaust gas purification device 100 for purifying the exhaust gas from the engine 1. An exhaust gas inlet pipe 116 of the exhaust gas purification device 100 serving as an exhaust gas inlet is arranged nearby a corner where the exhaust side surface intersects with a first side surface out of two side surfaces of the cylinder head 2 intersecting the exhaust side surface, and the low-pressure turbocharger 52 is disposed close to the first side surface in such a manner that a low-pressure exhaust gas outlet 61 of the low-pressure turbocharger 52 faces the first side surface. Therefore, in the engine 1, the exhaust communication pipe 119 and the exhaust connecting member 120 as an example of piping connecting the low-pressure exhaust gas outlet 61 of the low-pressure turbocharger 52 and the exhaust gas inlet pipe 116 of the exhaust gas purification device 100 can be shortened and simplified. This way, the exhaust gas supplied to the exhaust gas purification device 100 can be kept at a high temperature, and a drop in the regeneration performance of the exhaust gas purification device 100 can be suppressed or reduced.

Further, above the cylinder head 2, a blow-by gas outlet 70 of the blow-by gas recirculation device 19 is arranged in a position close to a second side surface of the cylinder head 2 on the opposite side of the first side surface in such a manner as to face toward the exhaust side surface, and a low-pressure fresh air inlet 63 of the low-pressure turbocharger 52 is provided to face the second side surface. Further, the blow-by gas outlet 70 is coupled with an air supply pipe 62 coupled to the low-pressure fresh air inlet 63 of the low-pressure turbocharger 52 through a recirculation hose 68. Thus, in the engine 1, the recirculation hose 68 can be shortened and measures against freezing inside the recirculation hose 68 are no longer necessary, by arranging both the blow-by gas outlet 70 of the blow-by gas recirculation device 19 and the air supply pipe 62 coupled to the low-pressure fresh air inlet 63 of the low-pressure turbocharger 52 at a position close to the second side surface of the cylinder head 2.

As shown in FIG. 1 to FIG. 5 and FIG. 11 to FIG. 16, the engine 1 includes the exhaust gas purification device 100 through the support pedestal 121 above the cylinder head 2. The support pedestal 121 has a flat portion 121*a* on which the exhaust gas purification device 100 is mounted, and a plurality of legs 121*b*, 121*c*, 121*d*, 121*e* which protrude downward from the flat portion 121*a* and are fixed to the cylinder head 2. The flat portion 121*a* and the leg portions 121*b*, 121*c*, 121*d*, 121*e* are formed integrally. The portions between the legs 121*b*, 121*c*, 121*d*, 121*e* are formed in arch-shapes. With the above-described integrally formed structure and the arch-shapes, the support pedestal 121 can be lightened, while maintaining its rigidity. Further, by making the support pedestal 121 an integrally molded part, the number of parts can be reduced. Further, since the arch-shaped gaps are formed between the plurality of legs 121*b*, 121*c*, 121*d*, 121*e*, heat accumulation around the legs of the support pedestal 121 can be suppressed or reduced, and damages to electronic components such as the exhaust pressure sensor 151 as an example of a sensor mounted around the legs, as well as insufficient cooling of the cooling parts such as the EGR cooler 27 can be suppressed or reduced.

In the engine 1, the exhaust manifold 4 and the air-intake manifold 3 are arranged in a distributed manner to the exhaust side surface and the air-intake side surface of the cylinder head 2. The support pedestal 121 is arranged above the first side surface out of the two side surfaces of the cylinder head 2 intersecting an axial direction of the crankshaft 5, and includes as the legs: the exhaust side leg 121*b* fixed to the exhaust side surface; the air-intake side leg 121*e* fixed to the air-intake side surface; and the center legs 121*c*, 121*d* fixed to the first side surface. Therefore, in the engine 1, the support pedestal 121 can be fixed to three surfaces of the cylinder head 2, i.e., the exhaust side surface, the air-intake side surface, and the first side surface. Therefore, the support rigidity of the exhaust gas purification device 100 can be improved. Further, by making the height and size of the arch-shape between the exhaust side leg 121*b* and the first center leg 121*c* different from the height and size of the arch-shape between the air-intake side leg 121*e* and the second center leg 121*d*, or making the lengths of the exhaust side leg 121*b* and the air-intake side leg 121*e* different from each other, vibration on the air-intake side and the exhaust gas side can be cancelled by the support pedestal 121, and vibration of the exhaust gas purification device 100 can be reduced.

Further, the engine 1 includes a cooling fan 9 on the second side surface out of the two side surface of the cylinder head 2. Between the cylinder head cover 18 on the cylinder head 2 and the support pedestal 121, there is a cooling air passage 148 in which cooling air 149 from the cooling fan 9 flows. Therefore, in the engine 1, the cooling air from the cooling fan 9 can be guided to the first side surface of the cylinder head 2 through the cooling air passage 148, and the surroundings of the first side surface of the cylinder head 2 can be suitably cooled.

Further, the engine 1 includes: an EGR device 24 configured to return a part of exhaust gas discharged from the exhaust manifold 4 to the air-intake manifold 3 as an EGR gas; an EGR cooler 27 configured to cool the EGR gas; and an exhaust pressure sensor 151 configured to detect an exhaust gas pressure in the exhaust manifold 4. The EGR cooler 27 and the exhaust pressure sensor 151 are attached to the first side surface of the cylinder head 2. Therefore, the cooling air 149 from the cooling fan 9 guided to the first side surface through the cooling air passage 148 can facilitate cooling of the EGR cooler 27 and achieve suppression and reduction of thermal damages to the exhaust pressure sensor 151.

Further, in the engine 1, the air-intake manifold 3 is integrally formed with the air-intake side surface of the cylinder head 2, and the air-intake side leg 121*e* is fixed to the upper surface of the air-intake manifold 3. Therefore, the air-intake side leg 121*e* can be placed on and fixed firmly on top of the robust air-intake manifold 3. Further, the work of tightening or loosening the pair of bolts for fixing the air-intake side leg 121*e* to the air-intake manifold 3 can be performed from the upper side of the cylinder head 2. Therefore, work for attaching and removing the support pedestal 121 can be performed while the EGR device 24 arranged on a lateral side of the air-intake side surface of the cylinder head 2 is attached to the air-intake manifold 3. Therefore, the workability for assembling and maintenance of the engine 1 can be improved.

As shown in FIG. 1 to FIG. 5 and FIG. 17 to FIG. 21, the engine 1 includes: the exhaust manifold 4 provided on the exhaust side surface of the cylinder head 2; and the exhaust pressure sensor 151 configured to detect an exhaust gas pressure in the exhaust manifold 4. The exhaust pressure sensor 151 is attached to the cylinder head 2. The exhaust pressure sensor 151 is connected to the exhaust manifold 4 through an exhaust pressure bypass path 153 provided in the cylinder head 2 and an exhaust pressure detection pipe 154 connecting the exhaust pressure bypass path 153 to the exhaust manifold 4. Therefore, the heat of the exhaust pressure detection pipe 154 can be radiated in the cylinder head 2. Therefore, in the engine 1, the length of the exhaust pressure detection pipe 154 can be shortened while avoiding failure or malfunction of the exhaust pressure sensor 151 caused by heat of the exhaust manifold 4 and the exhaust pressure detection pipe 154. Further, by shortening the length of the exhaust pressure detection pipe 154, the reliability of the exhaust pressure detection pipe 154 is improved, and the exhaust pressure detection pipe 154 is easily arranged. Therefore, the number of steps for designing can be reduced and the manufacturability and assemblability of the engine 1 can be improved. Further, in the cylinder head 2 of the engine 1, the cooling water passage 38 is provided nearby the exhaust pressure bypass path 153. Therefore, the gas temperature in the exhaust pressure bypass path 153 can be efficiently reduced. Therefore, in the engine 1, the exhaust pressure bypass path 153 can be shortened while the heat transmitted from the gas in the exhaust pressure bypass path 153 to the exhaust pressure sensor 151 is kept within an acceptable range, and the exhaust pressure bypass path 153 to the cylinder head 2 can be easily formed.

Further, the engine 1 includes: the EGR device 24 configured to return a part of exhaust gas discharged from the exhaust manifold 4 to the air-intake manifold 3 as an EGR gas; the EGR cooler 27 configured to cool the EGR gas. The cylinder head 2 has the pair of EGR cooler coupling portions 33, 34 which protrude from the first side surface out of two side surfaces of the cylinder head 2 intersecting the exhaust side surface. The cooling water passage 38 is connected to the EGR cooler 37 through one EGR cooler coupling portion 33, and the exhaust pressure bypass path 153 passes through the EGR cooler coupling portion 33. Therefore, the engine 1 can efficiently cool the gas in the exhaust pressure bypass path 153, and can suppress or reduce failure or malfunction of the exhaust pressure sensor 151 attributed to the heat.

Further, the exhaust pressure sensor 151 is attached to the exhaust pressure sensor attaching part 152 which protrudes from the first side surface of the cylinder head 2 between the pair of EGR cooler coupling portions 33, 34. Therefore, the engine 1 can efficiently cool the exhaust pressure sensor 151, and can suppress or reduce failure or malfunction of the exhaust pressure sensor 151 attributed to the heat.

The configurations of respective parts of the present invention are not limited to those of the illustrated embodiment, but can be variously changed without departing from the gist of the invention.

REFERENCE SIGNS LIST

1, engine (engine device)
2, cylinder head
3, air-intake manifold
4, exhaust manifold
30, two-stage turbocharger
51, high-pressure turbocharger
52, low-pressure turbocharger
59, high-pressure exhaust gas pipe (flexible pipe)
131, low-pressure turbocharger attaching part
135, rib
100, exhaust gas purification device
116, exhaust gas inlet pipe (exhaust gas inlet of exhaust gas purification device)
19, blow-by gas recirculation device
70, blow-by gas outlet
63, low-pressure fresh air inlet (fresh air inlet of low-pressure turbocharger)
62, air supply pipe
68, recirculation hose

The invention claimed is:

1. An engine device comprising:
a cylinder head;
an exhaust manifold;
an exhaust gas purification device configured to purify exhaust gas from the exhaust manifold; and
a two-stage turbocharger including a high-pressure turbocharger and a low-pressure turbocharger; and
wherein:
the high-pressure turbocharger is mounted on the exhaust manifold;
the low-pressure turbocharger is attached to the cylinder head;
the low-pressure turbocharger is arranged above the exhaust manifold and on an exhaust outlet side of the high-pressure turbocharger;
the high-pressure turbocharger and the low-pressure turbocharger are coupled to each other;
in a plan view of the engine device, a total distance between the low-pressure turbocharger and the cylinder head is less than a total distance between the high-pressure turbocharger and the cylinder head;
a first side of the cylinder head and a second side of the cylinder head intersect at a corner of the cylinder head, the first side being an exhaust gas side;
an exhaust gas inlet of the exhaust gas purification device is arranged opposite an exhaust gas outlet of the exhaust gas purification device and against the low-pressure turbocharger, and near the corner of the cylinder head;
the exhaust gas purification device is coupled to the second side of the cylinder head; and
the low-pressure turbocharger is arranged such that an exhaust gas outlet of the low-pressure turbocharger faces the second side of the cylinder head.

2. The engine device according to claim 1, wherein the high-pressure turbocharger is arranged near the exhaust manifold.

3. The engine device according to claim 1, wherein the high-pressure turbocharger and the low-pressure turbocharger are coupled to each other via a flexible pipe.

4. The engine device according to claim 3, wherein the flexible pipe has an L-shaped bent portion.

5. The engine device according to claim 4, wherein the flexible pipe includes a flexible straight portion on a high-pressure turbocharger side of the L-shaped bent portion.

6. The engine device according to claim 5, wherein the flexible straight portion is a bellows portion.

7. The engine device according to claim 3, wherein, starting from the high-pressure turbocharger, in order, the flexible pipe includes a portion connected to the high-pressure turbocharger, a straight portion, a bent portion, and a portion connected to the low-pressure turbocharger.

8. The engine device according to claim 1, further comprising a blow-by gas recirculation device that includes a blow-by gas outlet, wherein the blow-by gas outlet is arranged above the cylinder head.

9. The engine device according to claim 8, wherein the blow-by gas outlet is coupled to the low-pressure turbocharger.

10. The engine device according to claim 1, wherein the low-pressure turbocharger is fixed to an exhaust side surface of the cylinder head.

11. The engine device according to claim 1, further comprising an air-intake manifold, wherein the exhaust manifold is arranged on an exhaust side surface of the cylinder head, and the air-intake manifold is arranged on an air intake side of the cylinder head.

12. The engine device according to claim 1, further comprising an air-intake manifold that is integral with the cylinder head.

13. An engine device comprising:
a cylinder head;
an exhaust manifold; and
a two-stage turbocharger including a high-pressure turbocharger and a low-pressure turbocharger; and
wherein:
the high-pressure turbocharger is mounted on the exhaust manifold;
the low-pressure turbocharger is attached to the cylinder head;
the low-pressure turbocharger is arranged above the exhaust manifold;
the high-pressure turbocharger and the low-pressure turbocharger are coupled to each other via a flexible pipe;
the flexible pipe includes a flexible straight portion and an L-shaped bent portion;
the flexible straight portion is a bellows portion; and
in a plan view of the engine device, a distance between the low-pressure turbocharger and the cylinder head is less than a distance between the high-pressure turbocharger and the cylinder head.

14. The engine device of claim 13, wherein the bellows portion is on a high-pressure turbocharger side of the L-shaped bent portion.

15. An engine device comprising:
a cylinder head;
an exhaust manifold;
an exhaust gas purification device configured to purify exhaust gas from the exhaust manifold; and
a two-stage turbocharger including a high-pressure turbocharger and a low-pressure turbocharger; and
wherein:
the high-pressure turbocharger is mounted on the exhaust manifold;
the low-pressure turbocharger is attached to the cylinder head;

the low-pressure turbocharger is arranged above the exhaust manifold;

the high-pressure turbocharger and the low-pressure turbocharger are coupled to each other via a flexible pipe;

the flexible pipe includes a flexible straight portion and an L-shaped bent portion, the flexible straight portion on a high-pressure turbocharger side of the L-shaped bent portion;

the flexible straight portion is a bellows portion;

in a plan view of the engine device, a total distance between the low-pressure turbocharger and the cylinder head is less than a total distance between the high-pressure turbocharger and the cylinder head;

a first side of the cylinder head and a second side of the cylinder head intersect at a corner of the cylinder head; and the exhaust gas purification device is coupled to the second side of the cylinder head.

* * * * *